United States Patent
Sherman et al.

(10) Patent No.: US 9,944,304 B2
(45) Date of Patent: Apr. 17, 2018

(54) SHOPPING CART

(71) Applicant: ZIBRA, LLC, Charlotte, NC (US)

(72) Inventors: Michael Milton Sherman, Mooresville, NC (US); William Lane Ball, Statesville, NC (US)

(73) Assignee: ZIBRA, LLC, Mooresville, NC (US)

( * ) Notice: Subject to any disclaimer, the term of this patent is extended or adjusted under 35 U.S.C. 154(b) by 0 days.

(21) Appl. No.: 15/462,827

(22) Filed: Mar. 18, 2017

(65) Prior Publication Data
US 2017/0190347 A1   Jul. 6, 2017

Related U.S. Application Data

(63) Continuation of application No. 15/051,658, filed on Feb. 23, 2016, now Pat. No. 9,598,097.

(60) Provisional application No. 62/119,363, filed on Feb. 23, 2015, provisional application No. 62/276,215, filed on Jan. 7, 2016.

(51) Int. Cl.
*B62B 3/14*   (2006.01)
*B62B 5/06*   (2006.01)

(52) U.S. Cl.
CPC .............. *B62B 3/14* (2013.01); *B62B 3/144* (2013.01); *B62B 3/146* (2013.01); *B62B 3/1472* (2013.01); *B62B 3/1492* (2013.01); *B62B 5/064* (2013.01); *B62B 2301/04* (2013.01); *B62B 2501/067* (2013.01)

(58) Field of Classification Search
CPC .............. B62B 3/144; B62B 3/1444; B62B 3/1468–3/1476
See application file for complete search history.

(56) References Cited

U.S. PATENT DOCUMENTS

| | | | | | |
|---|---|---|---|---|---|
| 3,361,438 | A | * | 1/1968 | Davis | B62B 3/14 |
| | | | | | 280/33.991 |
| 4,116,456 | A | * | 9/1978 | Stover | B62B 3/144 |
| | | | | | 186/63 |
| RE32,453 | E | * | 7/1987 | Stover | B62B 3/144 |
| | | | | | 280/33.993 |
| 5,435,582 | A | * | 7/1995 | Davidson | B62B 3/1464 |
| | | | | | 280/33.992 |
| 5,595,394 | A | * | 1/1997 | Adamson | B62B 3/144 |
| | | | | | 280/33.993 |
| 5,848,797 | A | * | 12/1998 | Paez | B62B 3/144 |
| | | | | | 280/33.992 |

(Continued)

*Primary Examiner* — Erez Gurari
(74) *Attorney, Agent, or Firm* — Chad D. Tillman; Tillman Wright, PLLC

(57) ABSTRACT

A cart includes a chassis and attached wheels; an upper basket attached to the chassis; and a lower basket attached to the chassis. In some embodiments, the cart includes no widthwise push bar in a rear of the cart such that access is unobstructed to the upper and lower baskets from the rear of the cart by a person. In some embodiments, the chassis defines on each lateral side of the cart a pair of vertically spaced handles, each handle surrounding and defining an opening. The handles preferably include handle bars shaped in an oval. On each cart side a curved elongate member extends between and connects the handles, and the curved elongate members represent the rearmost part of the cart. The rear area of the upper basket defines a seat for an infant, and a rear ledge of the lower basket defines a seat for a toddler.

20 Claims, 41 Drawing Sheets

(56) References Cited

U.S. PATENT DOCUMENTS

| | | | | |
|---|---|---|---|---|
| 5,865,449 | A * | 2/1999 | Castaneda | B62B 3/182 280/33.996 |
| 5,918,891 | A * | 7/1999 | Russell | B62B 3/144 280/33.991 |
| 6,126,181 | A * | 10/2000 | Ondrasik | B62B 3/1468 280/33.991 |
| 6,186,521 | B1 * | 2/2001 | Divoky | A47D 15/006 280/33.992 |
| 2001/0022436 | A1 * | 9/2001 | Simard | B62B 3/1468 280/33.991 |
| 2003/0151219 | A1 * | 8/2003 | Simard | B62B 3/1468 280/47.35 |
| 2009/0309322 | A1 * | 12/2009 | Selvig | B62B 3/14 280/33.996 |
| 2011/0115177 | A1 * | 5/2011 | de Sousa | B62B 3/144 280/47.35 |

* cited by examiner

200

SHOPPING CART

CROSS-REFERENCE TO RELATED APPLICATION

The present application is a continuation of, and claims priority under 35 U.S.C. 120 to, U.S. patent application Ser. No. 15/051,658, filed Feb. 23, 2016, now U.S. Pat. No. 9,598,097, which '658 application including appendix thereof and '097 patent are incorporated by reference herein, and which '658 application is a nonprovisional of, and claims priority under 35 U.S.C. 119(e) to, each of U.S. provisional patent application 62/119,363, and U.S. provisional patent application 62/276,215, both of which provisional patent applications are incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to carts and, more particularly, to shopping carts.

A conventional shopping cart is shown in FIG. 31. It is believed that few, if any, improvements have been made to the shopping cart in recent decades. Consequently, it is believed that the time has come for new improvements to carts in general, and such shopping carts in specific. One or more aspects and features of the present invention are believed to represent such an improvement.

SUMMARY OF THE INVENTION

The present invention includes many aspects and features. Moreover, while many aspects and features relate to, and are described in, the context of shopping, the present invention is not limited to use only in shopping, as will become apparent from the following summaries and detailed descriptions of aspects, features, and one or more embodiments of the present invention.

Accordingly, in an aspect of the invention, a cart includes a chassis; wheels attached to the chassis; an upper basket attached to the chassis and defining an upper cargo area for receiving articles for transport on the cart; and a lower basket attached to the chassis and defining a lower cargo area for receiving articles for transport on the cart.

In a feature of this aspect, the cart comprises a shopping cart.

In a feature of this aspect, one or both of the baskets each comprises a compartment divider for forming a plurality of compartments in the cargo area of the basket for separating articles placed in the basket. In a further related feature, the one or more dividers each is selectively transitionable between an upright position, in which the divider compartmentalizes the cargo receiving area, and a stowed position, in which the divider does not compartmentalize the cargo receiving area.

In a feature of this aspect, one or both of the baskets each comprises a wire basket.

In a feature of this aspect, one or both of the baskets each comprises a wire grid defining a bottom of the basket. In additional related features, both baskets each comprises a wire grid defining a bottom of the basket, with the grid of the upper basket defining smaller openings between wires than that defined by the grid of the lower basket. In another additional related feature, the wire grid bends to extend upwardly at the front of the basket to further define a front wall of the basket.

In a feature of this aspect, one or both of the baskets each comprises lengthwise wires at least some of which extend in generally parallel, spaced relation to define a side wall of the basket.

In a feature of this aspect, the upper basket is cantilevered over the lower basket. In an additional related feature, the chassis comprises a widthwise support member on which the upper basket is cantilevered over the lower basket. In some embodiments, such widthwise support member is the only part of the chassis that extends the width of the cart underneath and in engagement with the upper basket and that is directly connected to and directly supports the upper basket in its cantilevered position over the lower basket.

In a feature of this aspect, the cart further comprises a rack located under the lower basket. The rack preferably comprises a wire framework that is bounded at the front and sides by the chassis, including a portion of the chassis that defines a U-shaped bottom bumper of the cart that extends around the front and part of the sides of the bottom of the cart. In an additional related feature, the lower basket is cantilevered over the rack, and the chassis comprises a widthwise support member on which the lower basket is cantilevered over the rack. In some embodiments, such widthwise support member is the only part of the chassis that extends the width of the cart underneath and in engagement with the lower basket and that is directly connected to and directly supports the lower basket in its cantilevered position over the rack.

In a feature of this aspect, the wheels include a pair of front wheels and a pair of back wheels. In an additional related feature, each wheel of the two pair of wheels swivel 360 degrees. In an alternative additional related feature, each of the pair of front wheels swivel 360 degrees, and neither of the pair of back wheels swivels.

In a feature of this aspect, the cart is designed and configured to nest with other like carts. In an additional related feature, the nesting is accomplished by pushing the front of a first one of the carts into the rear of a second one of the carts such that the upper basket of the first cart is received within the upper basket of the second cart, and the lower basket of the first cart is received within the lower basket of the second cart. When nesting, a rear wall of the upper basket of the second cart preferably collapses in response to the front of the upper basket of the first cart being pushed there against, and a rear wall of the lower basket of the second cart preferably collapses in response to the front of the lower basket of the first cart being pushed there against.

In a feature of this aspect, the cart comprises one or more cup holders. In an additional related feature, each cup holder is attached to the chassis of the cart at the uppermost part of the cart.

In a feature of this aspect, the cart comprises a latch located on or attached to a basket on a side of the cart, whereby a purse or other personal item having a strap or ring can be latched to the cart in a secure location and manner.

In a feature of this aspect, the cart includes no widthwise push bar in a rear of the cart for pushing of the cart by a person such that access is unobstructed to the upper basket and to the lower basket from the rear of the cart by a person.

In a feature of this aspect, the chassis comprises elongate members connected together, such as for example by welding or by being integrally connected through molding or other formation technique. The elongate members may comprise, for example, tubes having oval, rectangular, triangular, or other polygonal cross-sectional profiles, as well as combinations thereof. Still yet, in some embodiments the chassis consists of such elongate members connected together. The elongate members further may be bent.

In a feature of this aspect, the chassis defines areas on opposite lateral sides of the cart for gripping and pushing the cart by a person when standing at the rear of the cart. These areas of the chassis preferably are curved. In an additional related feature, the chassis defines on each of the opposite lateral sides of the cart a pair of vertically spaced handles, wherein each handle surrounds and defines an interior opening area. In this respect, each handles may comprise a handle bar shaped in an oval, and the interior opening area can be used for promotional space. Furthermore, one or more elongate members of the chassis on each side of the cart extend between and connect the handles. In some embodiments including such features, the handles and an elongate member connecting the handles on a lateral side of the cart define the shape of armless spectacles. In some embodiments including such features, such elongate member is curved and in the shape of an arc in extending between the handles, with such elongate member extending beyond the rear of the upper basket and the rear of the lower basket so as to define the rearmost part of the cart. Furthermore, in some embodiments including such features, the handles on each side are vertically located over a wheel of the cart.

In a feature of this aspect, the rear area of the upper basket preferably defines a seat for an infant.

In a feature of this aspect, the lower basket defines a seat at a rear area thereof for a toddler. In an additional related feature, a rear wall of the lower basket moves away so that the rear area including a resulting rear edge of the lower basket is used as a ledge for sitting of the toddler. Additionally, the rear of the upper basket is horizontally offset toward the front of the cart relative to the rear of the lower basket so as to provide clearance by which a toddler sits up when seated on the rear ledge of the lower basket.

Additional aspects and features in accordance with one or more embodiments of the invention are disclosed in the draft one-page marketing sheet of the Appendix, which is incorporated herein by reference.

Yet another aspect comprises making a cart in accordance with one or more of the foregoing aspects and features.

Another aspect comprises using a cart in accordance with one or more of the foregoing aspects and features.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings.

DETAILED DESCRIPTION

Figure 1:
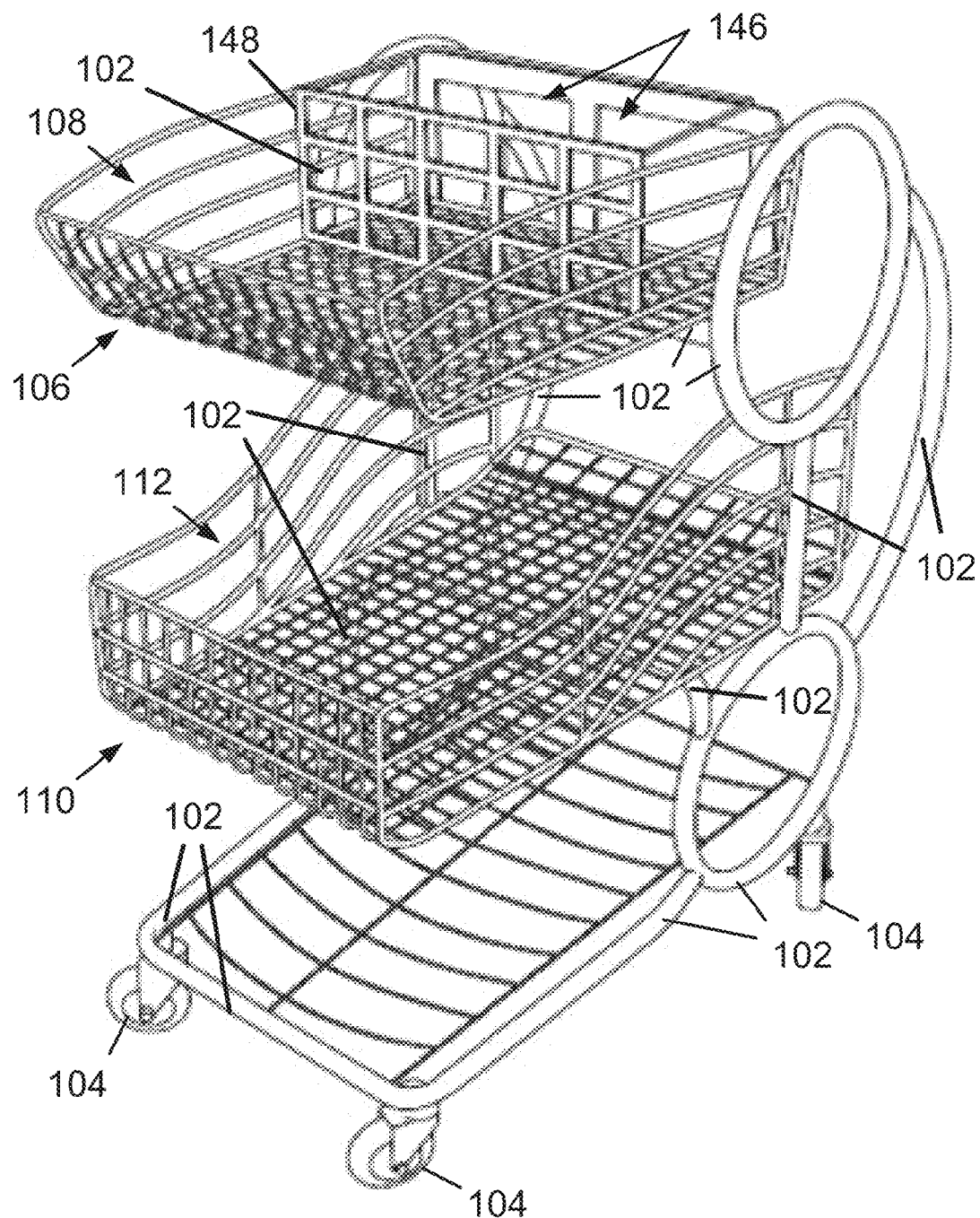
FIG. 1 is a perspective front left view of a cart in accordance with an embodiment of the present invention.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention in any claim of a patent issuing here from, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. 112, subsection (f), no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Figure 2:
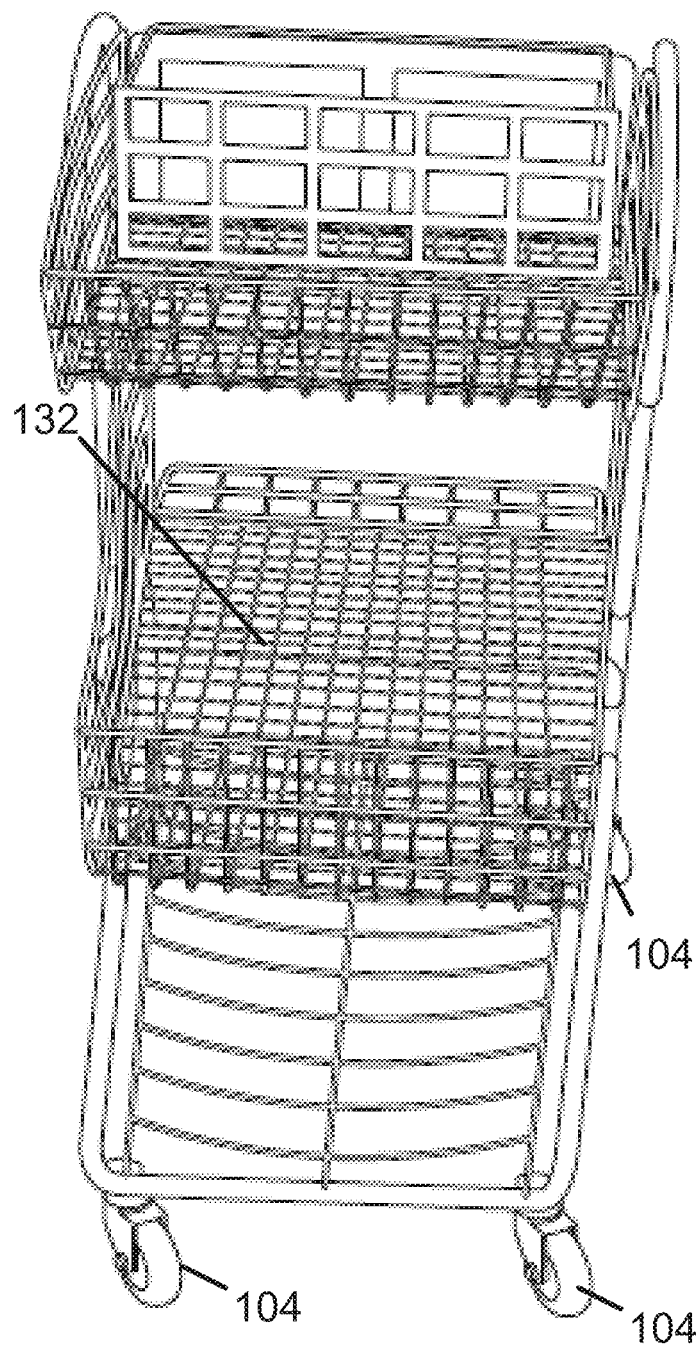
FIG. 2 is a perspective view of the front of the cart of FIG. 1.
Figure 3:
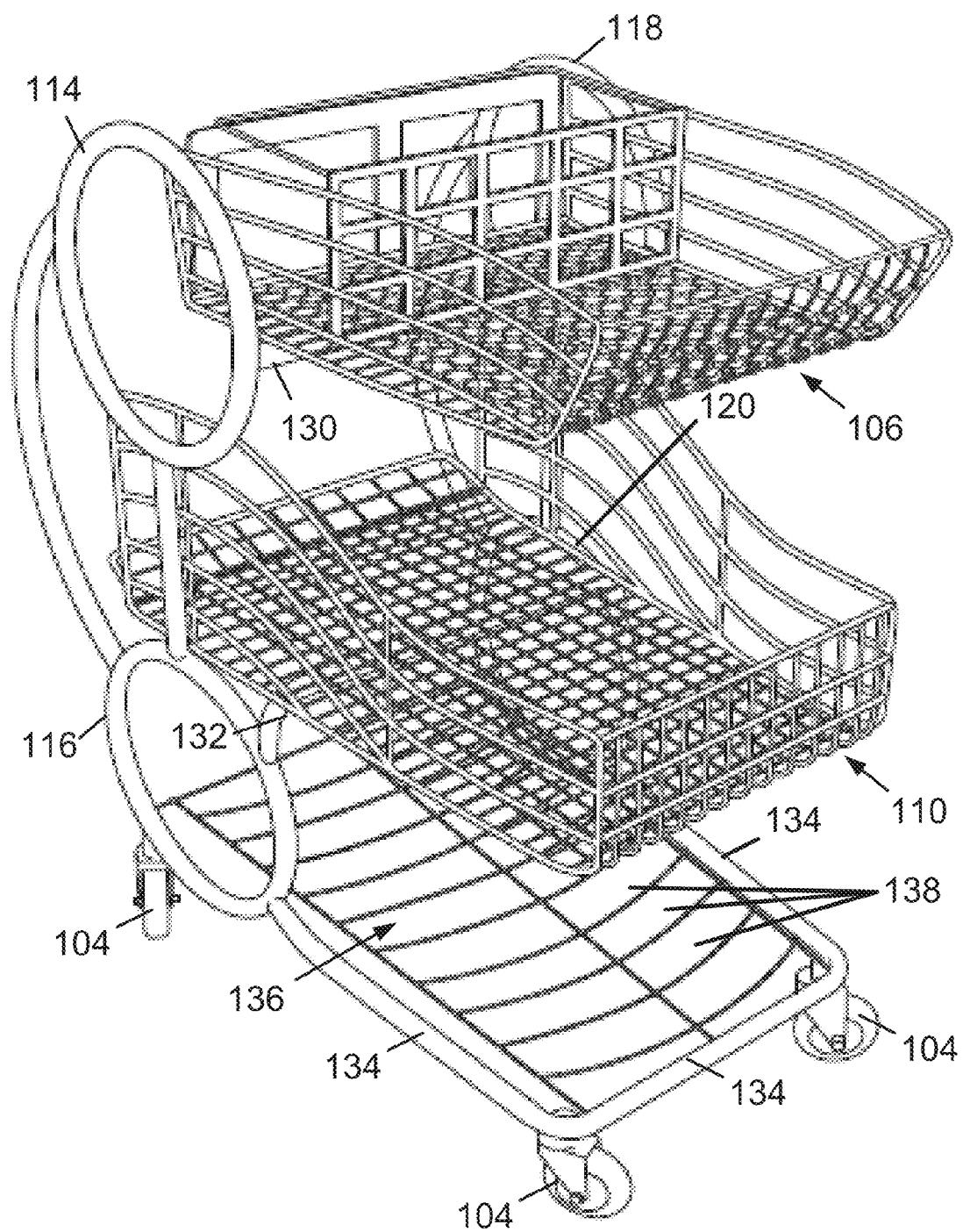
FIG. 3 is a perspective front right view of the cart of FIG. 1.
Figure 4:
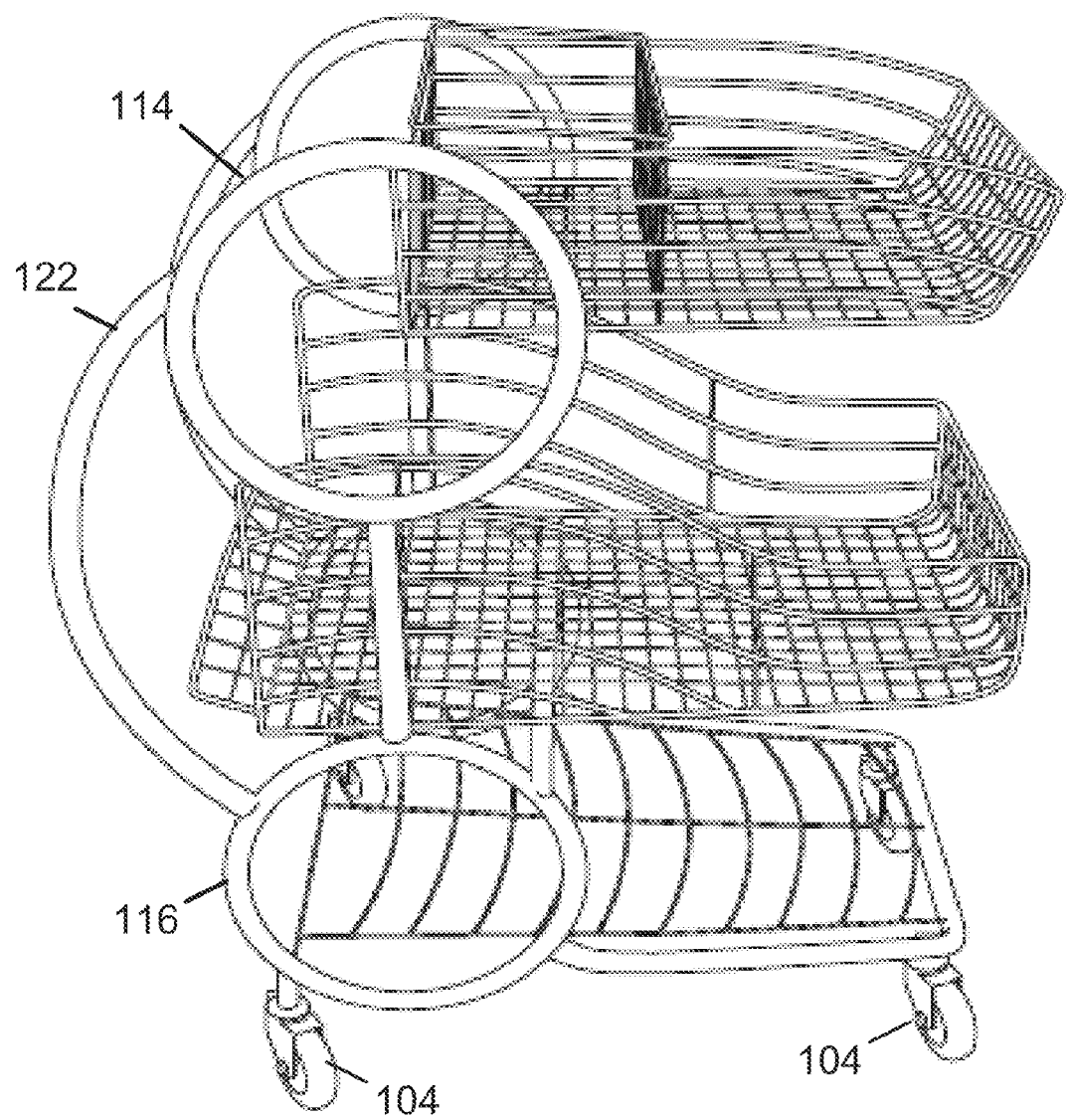
FIG. 4 is a perspective right side view of the cart of FIG. 1.
Figure 4A:
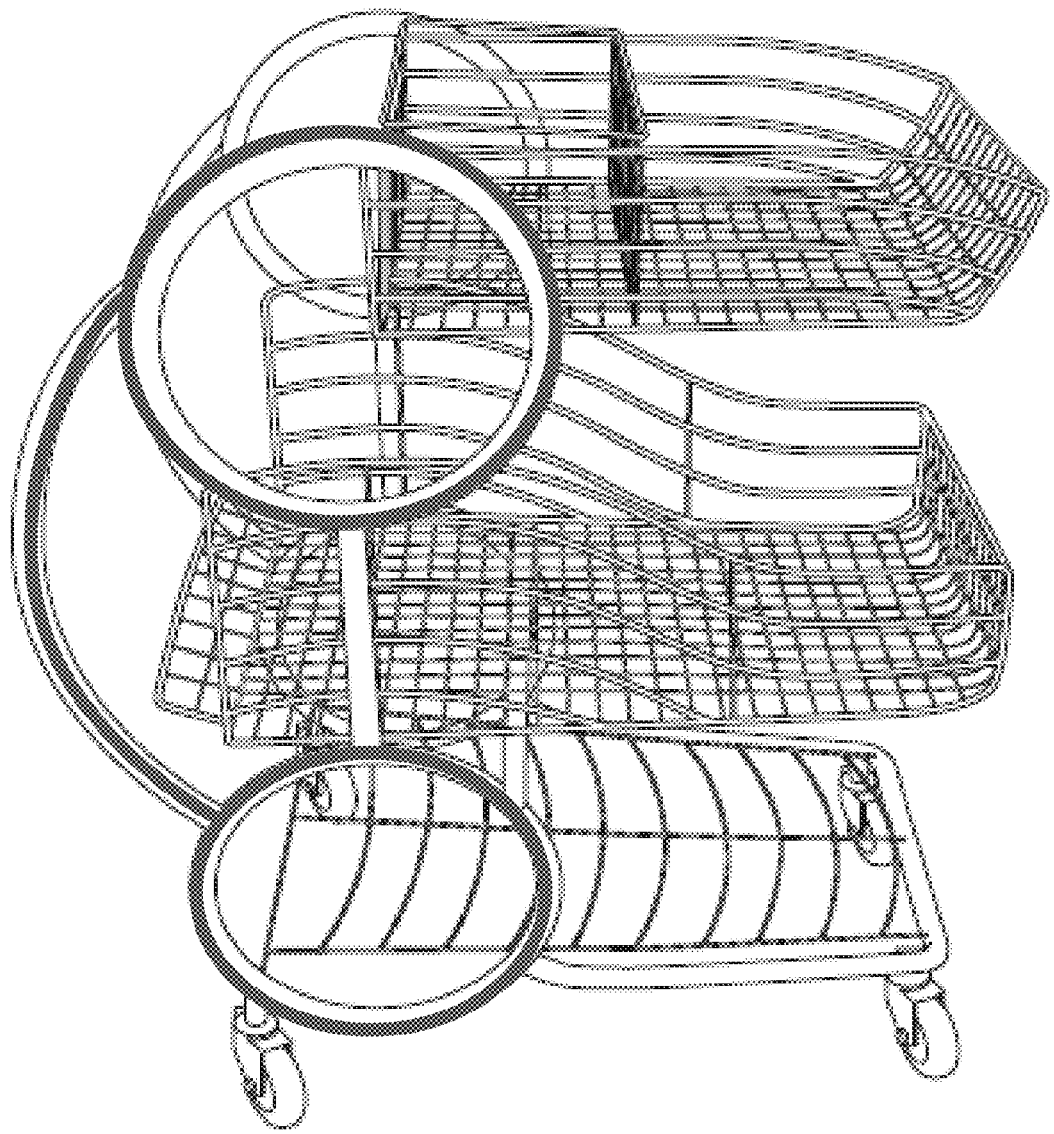
FIG. 4a is another perspective right side view similar to FIG. 4 schematically illustrating a shape resembling armless spectacles formed by portions of the chassis on the right side of the cart.
Figure 4B:
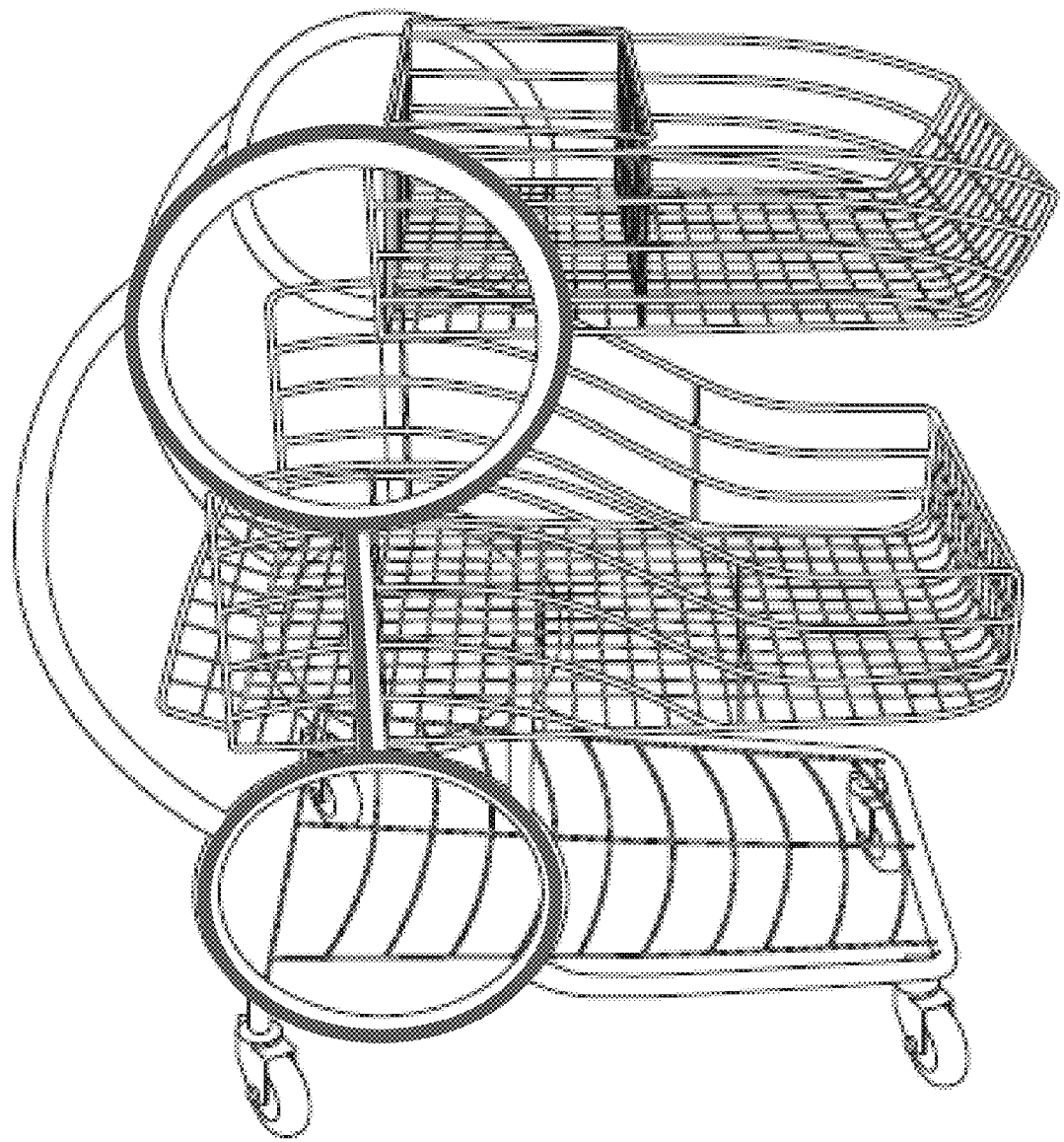
FIG. 4b is another perspective right side view similar to FIG. 4 schematically illustrating another shape resembling armless spectacles formed by portions of the chassis on the right side of the cart.
Figure 5:
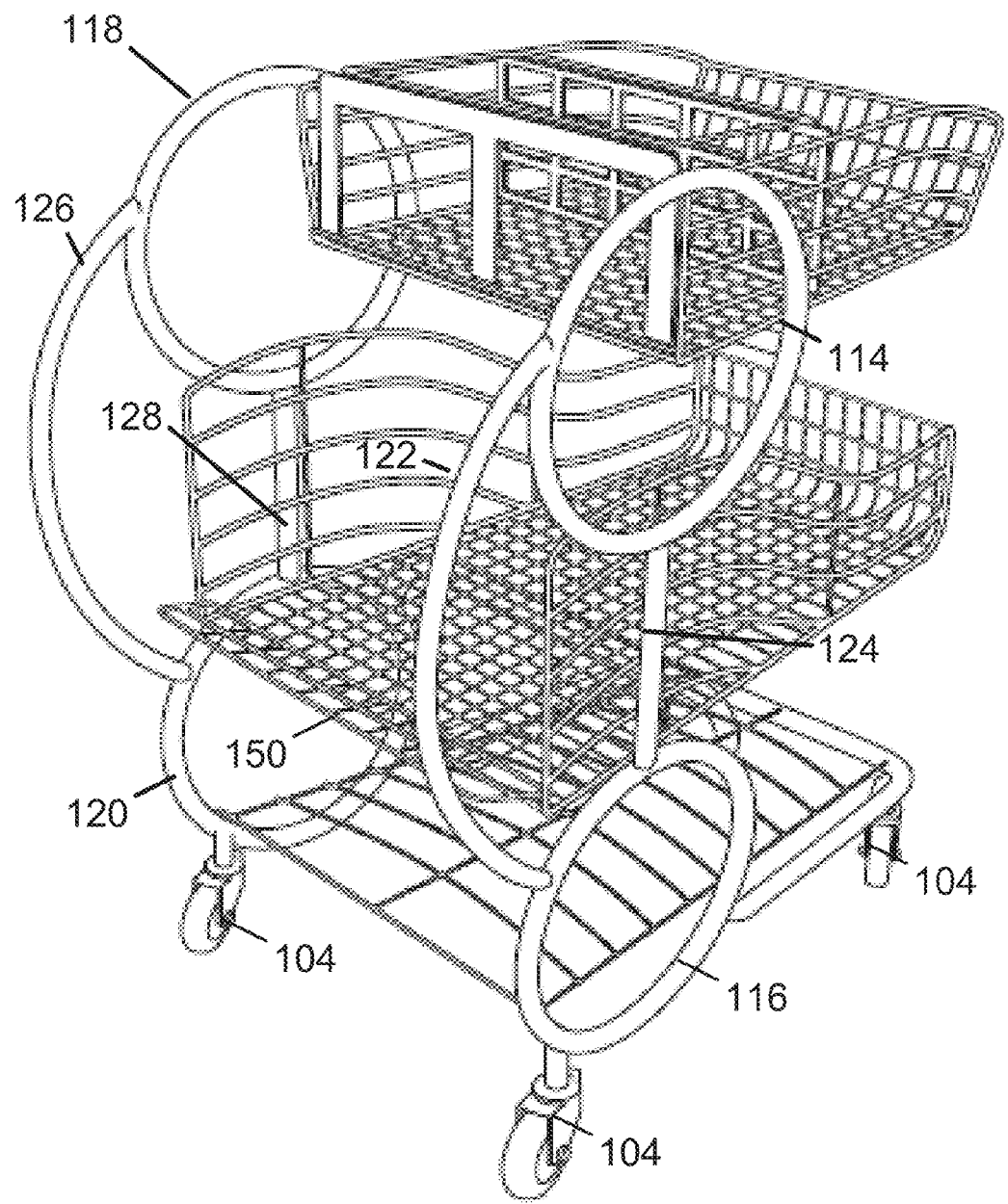
FIG. 5 is a perspective back right view of the cart of FIG. 1.
Figure 6:
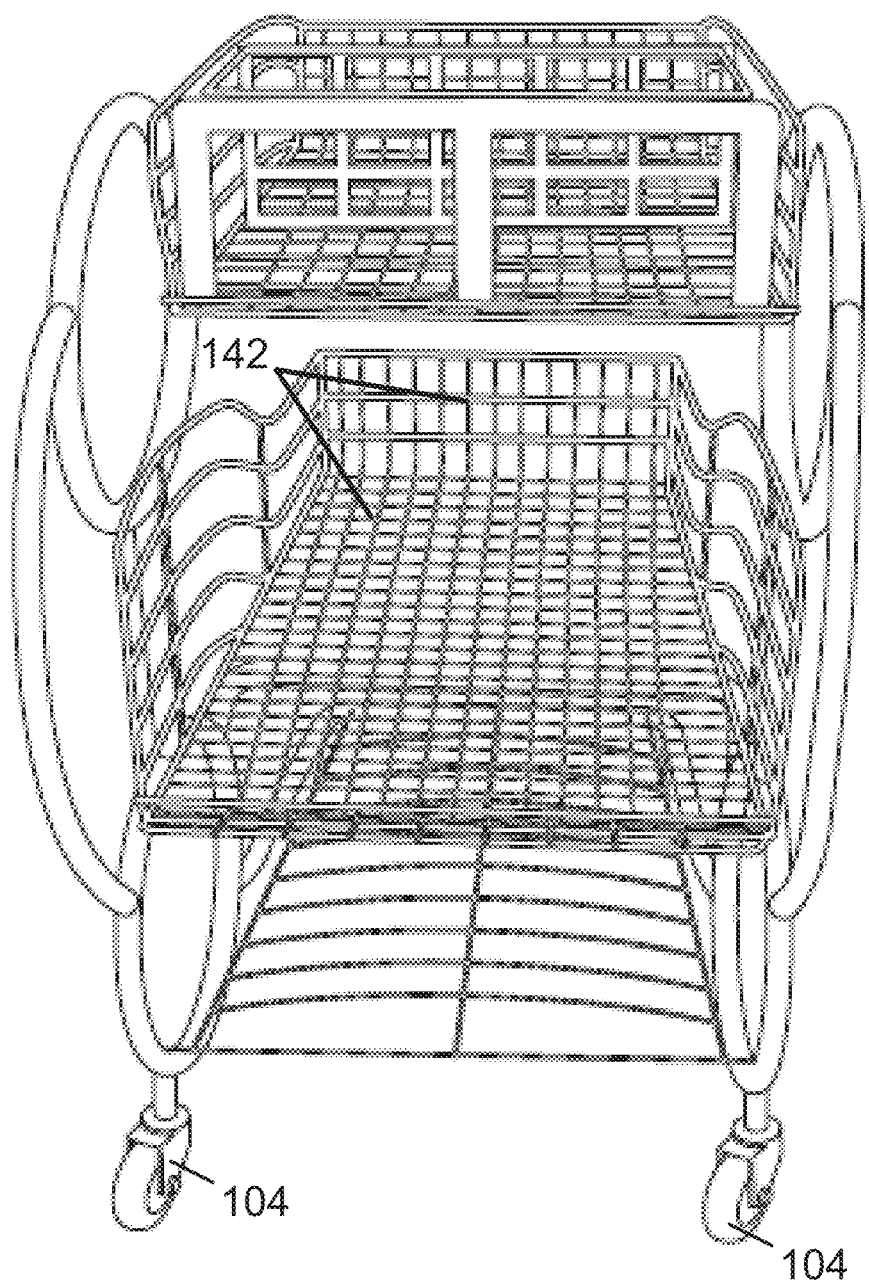
FIG. 6 is a perspective view of the back of the cart of FIG. 1.
Figure 7:
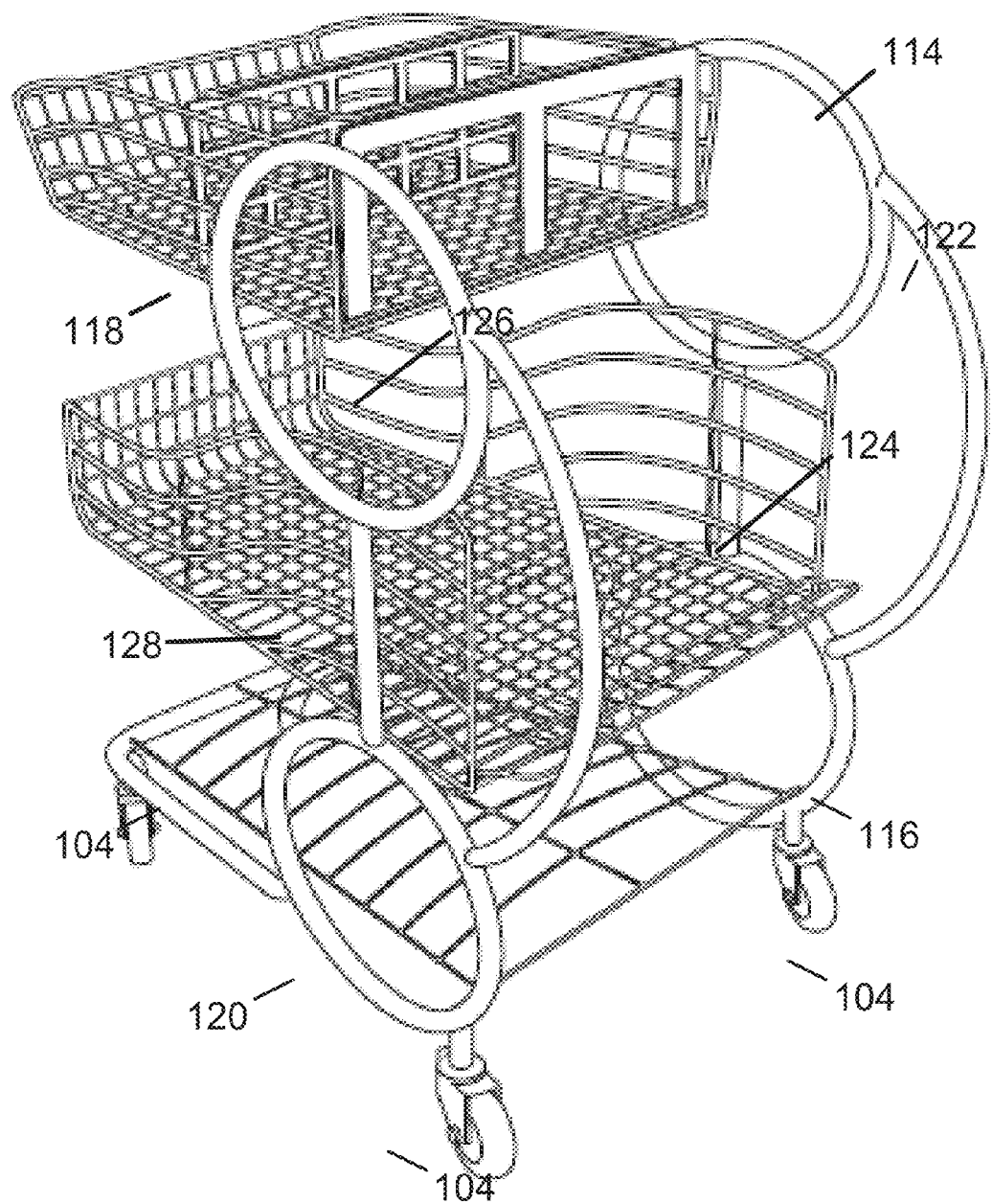
FIG. 7 is a perspective back left view of the cart of FIG. 1.
Figure 8:
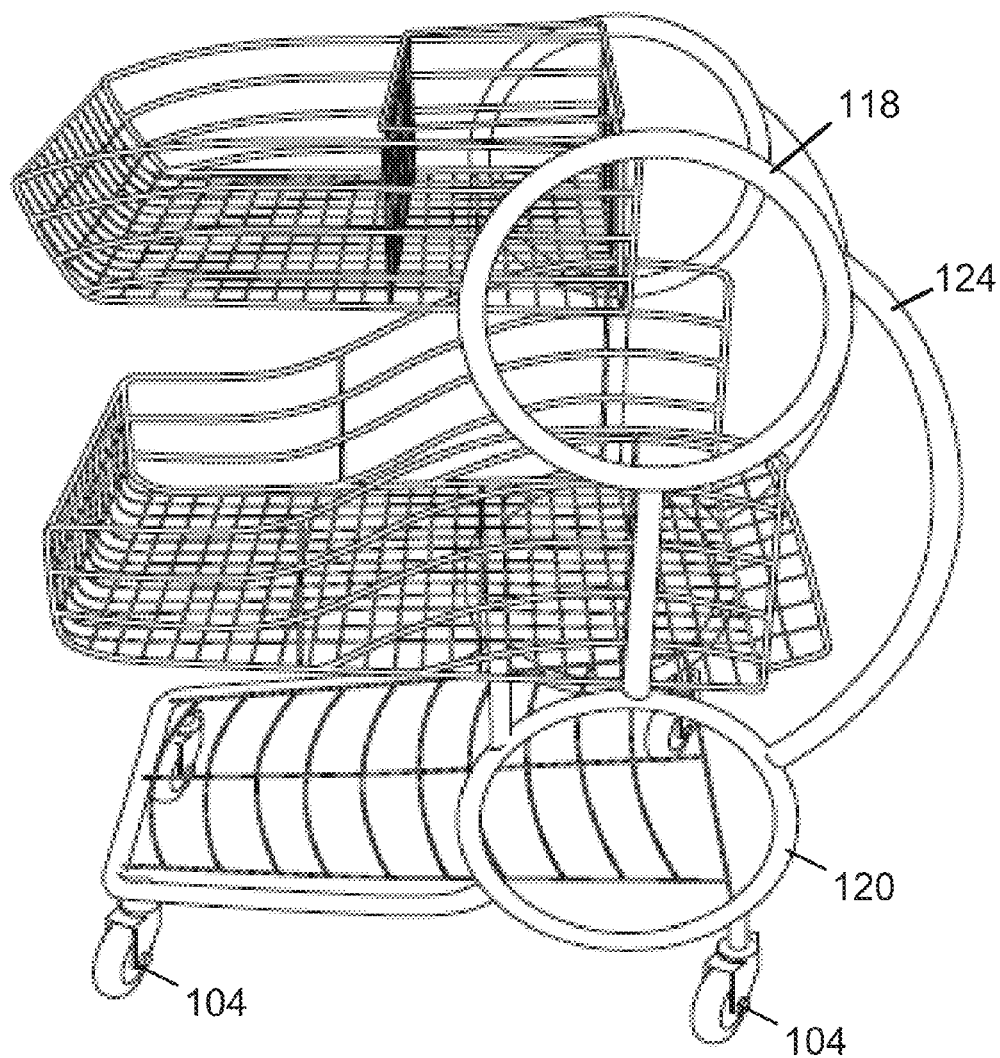
FIG. 8 is a perspective left side view of the cart of FIG. 1.
Figure 9:
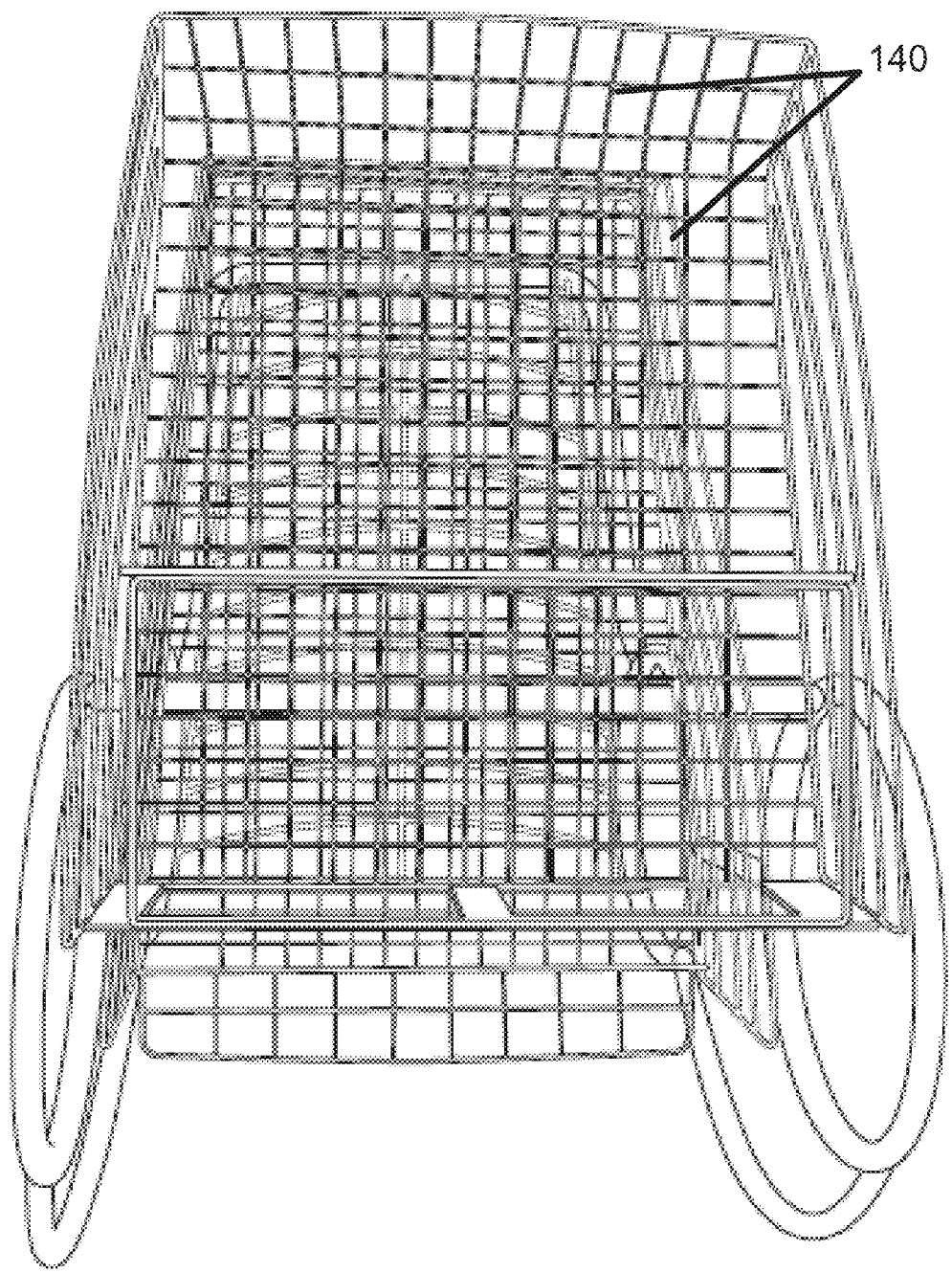
FIG. 9 is a perspective view of the top of the cart of FIG. 1.
Figure 10:
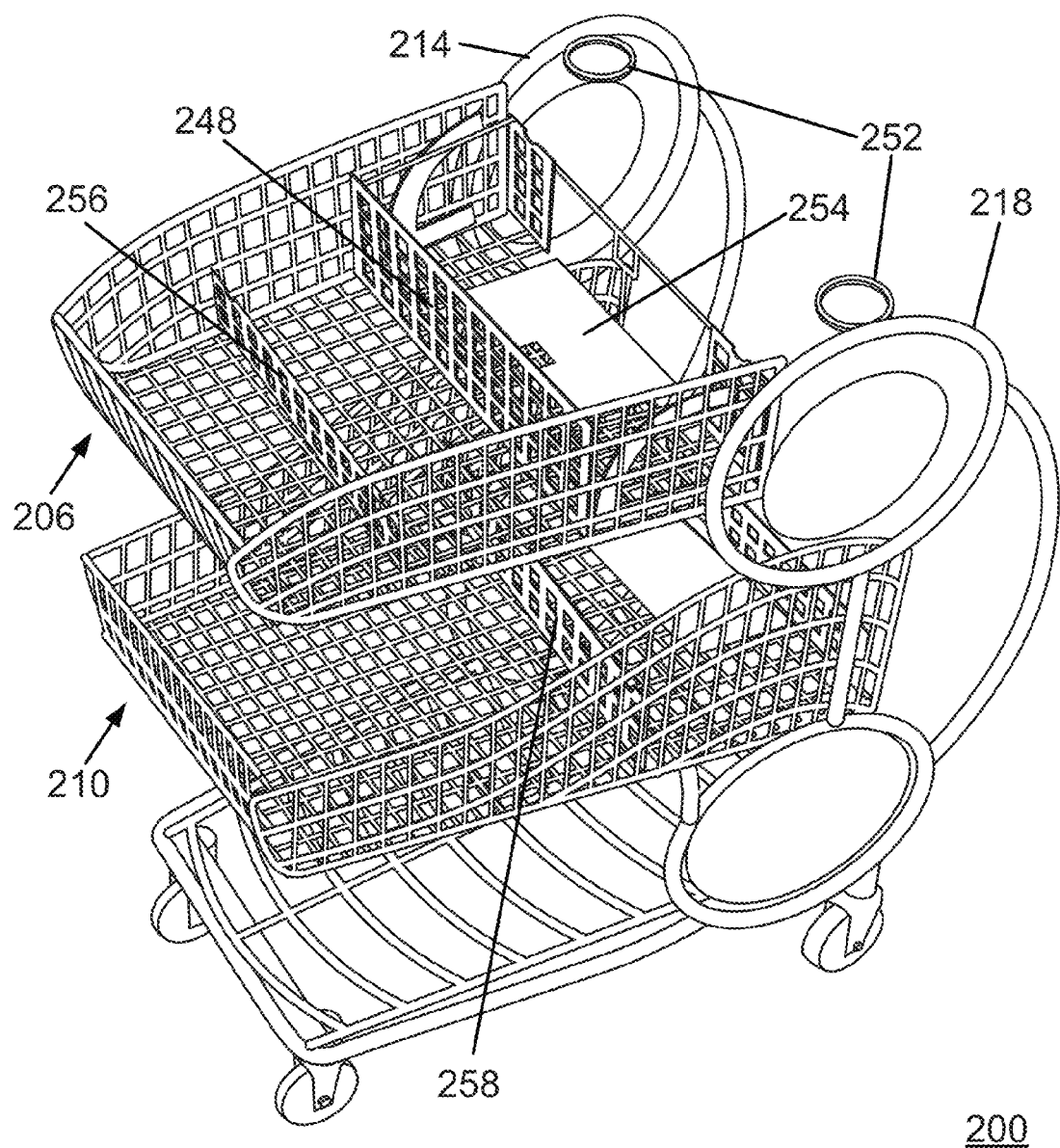
FIG. 10 is a perspective top left front view of a cart in accordance with another embodiment of the present invention.

Turning now to FIGS. 1-9, FIG. 1 is a perspective front left view of a cart 100 in accordance with an embodiment of the present invention; FIG. 2 is a perspective view of the front of the cart 100; FIG. 3 is a perspective front right view of the cart 100; FIG. 4 is a perspective right side view of the cart 100; FIG. 4a is another perspective right side view similar to FIG. 4 schematically illustrating a shape resembling armless spectacles formed by portions of the chassis on the right side of the cart 100; FIG. 4b is another perspective right side view similar to FIG. 4 schematically illustrating another shape resembling armless spectacles formed by portions of the chassis on the right side of the cart 100; FIG. 5 is a perspective back right view of the cart 100; FIG. 6 is a perspective view of the back of the cart 100; FIG. 7 is a perspective back left view of the cart 100; FIG. 8 is a perspective left side view of the cart 100; and FIG. 9 is a perspective view of the top of the cart 100.

With particular reference to FIG. 1, the cart 100 preferably is a shopping cart that comprises a chassis 102; wheels 104 attached to the chassis 102; an upper basket 106 attached to the chassis 102 that defines an upper cargo area 108 for receiving articles for transport on the cart 100; and a lower basket 110 attached to the chassis 102 that defines a lower cargo area 112 for receiving articles for transport on the cart 100.

The chassis 102 as shown consists of elongate members in the form of pipes or tubes connected together by welding and by being integrally molded together or made through other formation techniques, including bending. The elongate members as shown include generally oval cross-sectional profiles. The elongate members form different parts of the chassis, as now described in detail.

In greater detail, the chassis 102 defines areas on opposite lateral sides of the cart 100 for gripping and pushing the cart by a person when standing at the rear of the cart 100. With particular reference to FIG. 4 showing the right hand side of the cart 100 and FIG. 8 showing the left hand side of the cart 100, such areas of the chassis 102 include a pair of vertically spaced handles on the right hand side of the cart 100, including an upper handle 114 and a lower handle 116; and a pair of vertically spaced handles on the left hand side of the cart 100, including an upper handle 118 and a lower handle 120. The handle pair on the right hand side is vertically located over a rear wheel 104, and the handle pair on the left hand side is vertically located over the other rear wheel 104.

As further best seen in FIGS. 5 and 7, elongate members 122,124 of the chassis 102 extend between and connect the handles 114,116 on the right side of the cart 100; and elongate members 126,128 of the chassis 102 extend between and connect the handles 118,120 on the right side of the cart 100. Of these elongate members, elongate members 124,128 each is linear in extending between handles, and elongate members 122,126 each is curved in an arc in extending between handles and extends beyond the rear of the upper basket 106 and the rear of the lower basket 110 so as to define the rearmost part of the cart 100.

Figure 8A:
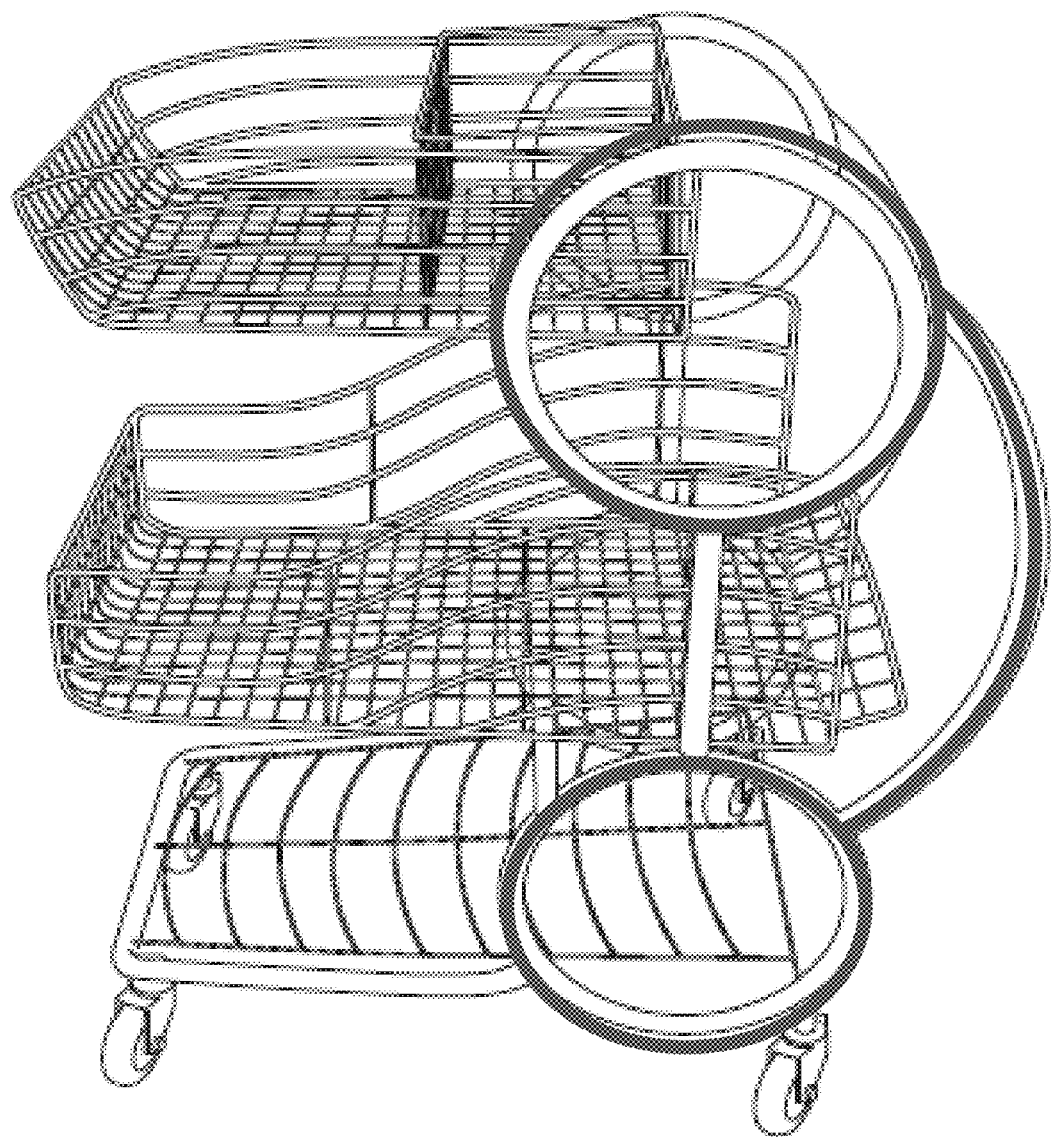
FIG. 8a is another perspective left side view similar to FIG. 8 schematically illustrating a shape resembling armless spectacles formed by portions of the chassis on the left side of the cart.
Figure 8B:
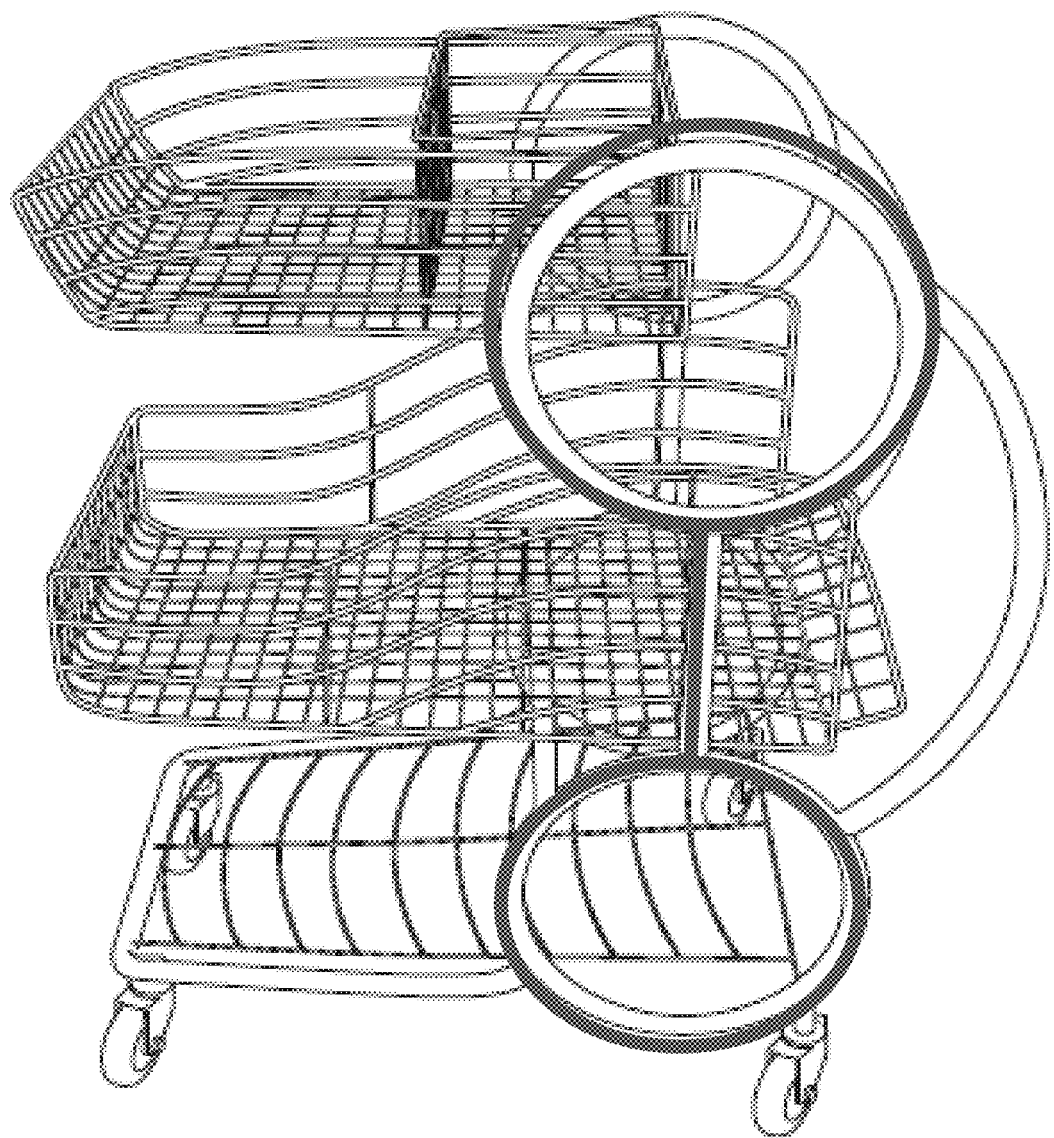
FIG. 8b is another perspective left side view similar to FIG. 8 schematically illustrating another shape resembling armless spectacles formed by portions of the chassis on the left side of the cart.

As schematically illustrated in FIG. 4a, handles 114,116 and connecting elongate member 122 on the right hand lateral side of the cart 100 define the shape of armless spectacles, and as schematically illustrated in FIG. 8a, handles 118,120 and connecting elongate member 126 on the left hand lateral side of the cart 100 define a similar shape of armless spectacles. A different shape of armless spectacles is defined by handles 114,116 and connecting elongate member 124 as schematically illustrated in FIG. 4b, and is defined by handles 118,120 and connecting elongate member 128 as schematically illustrated in FIG. 8b.

It is recognized that, in practice, the upper handles of the pairs and the connecting elongate members 122,126 would be utilized in gripping, pushing, and steering the cart 100 by a person located at the rear of the cart 100, and that the lower handle of each pair rarely, if ever, would be utilized in gripping, pushing, or steering the cart 100. The portions of the chassis 102 forming the lower handles 116,120 nonetheless are referred to as "handles" insofar as they are similar in construction and appearance to handles 114,118.

It further is contemplated that, while each handle is shown to comprise a handle bar that has been shaped into an oval configuration to surround and define an interior opening area, the configuration may be polygonal in shape and that the interior opening area may be partially surrounded rather than entirely surrounded. It also is contemplated that the interior opening area of each handle be used for promotional space, as described in further detail below with reference to cart 200. It is believed that such areas do not aesthetically appear as secondary or separate from the cart design, but rather serve to fill-in and complete the cart design.

Continuing with further detailed description regarding the chassis 102, and as perhaps best seen in FIG. 3, the chassis 102 comprises a generally linear, widthwise support member 130 on which the upper basket 106 is supported, and the chassis 102 comprises a U-shaped, widthwise support member 132 on which the lower basket 110 is supported. Furthermore, widthwise support member 130 extends between and connects handles 114,118; and widthwise support member 132 extends between and connects handles 116,120.

As also shown in FIG. 3, the chassis 102 also includes defines a U-shaped bottom bumper 134 of the cart 100 that extends around the front and partway along the sides of the bottom of the cart 100. The cart 100 further comprises a rack 136 that is located under the lower basket 110 and that is bounded by the U-shaped bottom bumper 134 and the handles 116,120. The rack 136 comprises a wire framework including horizontal wire supports 138 that are bowed to allow for products to slide more easily onto the rack 136.

From the foregoing, it will be appreciated that the upper basket 106 is cantilevered over the lower basket 110, and the widthwise support member 130 supports the upper basket 106 in its cantilevered position over the lower basket 110. Moreover, as shown, the widthwise support member 130 is the only part of the chassis 102 that extends the width of the cart 100 and is directly connected to and directly supports the upper basket 106 in its cantilevered position over the lower basket 110.

Similarly, it will be appreciated that the lower basket 110 is cantilevered over the rack 136, and the widthwise support member 132 supports the lower basket 110 in its cantilevered position over the rack 136. Moreover, as shown, the widthwise support member 132 is the only part of the chassis 102 that extends the width of the cart 100 and is directly connected to and directly supports the lower basket 110 in its cantilevered position over the rack 136.

Turning now to the wheels 104, the cart 100 comprises four wheels 104 including a pair of front wheels 104 and a pair of back wheels 104. Each wheel 104 preferably is the same as the others and swivels in all directions, i.e., 360 degrees. It is believed that enabling all wheels to swivel freely will prevent extensive wear and tear on wheels inside and out that is seen in conventional carts, thereby reducing maintenance. It is further believed that enabling all wheels to swivel freely will provide for easier maneuverability of the cart in stores and parking lots when nested in groups and pushed by attendants, as well as achieve smooth fluid maneuverability of the cart in a store by a shopper whether the cart is empty, partially loaded, or fully loaded. In an alternative embodiment, the pair of front wheels swivel 360 degrees, but neither of the back wheels swivel thereby providing a more fixed direction when pushing the cart forward.

Turning now to the baskets, the upper basket 106 is attached to the chassis 102 such as by welding and is located at an elevation of around chest height for the average shopper, while the lower basket 110 is likewise attached to the chassis 102 and is located at an elevation of around thigh height for the average shopper.

As described above, the upper basket 106 is primarily supported by the single upper widthwise support member 130 that extends underneath the upper basket 106 between and is connected to the upper handles 114,118, with the upper widthwise support member 130 being located closer to the rear of the upper basket 106 than to the front of the upper basket 106 such that the upper basket 106 cantilevers over the lower basket 110. The upper basket 106 preferably is welded to the widthwise support member upper 130 as well as is welded along its sides to portions of the chassis 102 that are located at the sides of the cart 100.

The lower basket 110 is primarily supported on the single lower widthwise support member 132 that extends underneath the lower basket 110 between and is connected to the lower handles 116,120, with the lower widthwise support member 132 being located closer to the rear of the lower basket 110 than to the front of the lower basket 110 such that the lower basket 110 cantilevers over the rack 136. The lower basket 110 preferably is welded to the lower widthwise support member 132 as well as is welded along its sides to portions of the chassis 102 that are located at the sides of the cart 100.

As shown upper basket 106 comprises a wire basket having a wire grid 140 that defines a bottom of the upper basket 106. Furthermore, the wire grid 140 preferably bends to extend upwardly at the front of the upper basket 106 to define a front wall of the upper basket 106, as perhaps best seen in FIG. 9. Similarly, as shown lower basket 110 comprises a wire basket having a wire grid 142 that defines a bottom of the lower basket 110. Furthermore, the wire grid 142 preferably bends to extend upwardly at the front of the lower basket 110 to define a front wall of the lower basket 110, as perhaps best seen in FIG. 6.

In some embodiments, the wire grid of one of the baskets, such as the upper basket, includes a tighter cross-hatching of the wire thereby defining smaller openings or interstices between the wires thereof than the openings defined by the wires of the grid of the other basket. In other embodiments the openings defined by the wires of the grid are approximately the same. In any event, it is preferred that a sufficient opening be defined for rinsing and drying of the cart after exposure to inclement weather.

The opposite lateral side walls of each basket as illustrated each comprises lengthwise wires that extend in generally parallel, spaced relation from front to back of the basket. Furthermore, the upper basket 106 is shorter in length than the lower basket 110, with the front edges of the baskets 106,110 generally overlying one another but with the back edges of the baskets 106,110 being offset.

The height between the top and bottom of the side walls of the upper basket 106 reduces in height near the front of the upper basket 106 in a direction from back to front of the cart 100, whereby a low-profile front of the upper basket 106 is defined that accommodates loading of articles into the upper basket 106 from the front of the cart 100. In contrast, the height between the top and bottom of the side walls of the lower basket 110 is greatest at the rear of the cart 100 and reduces in height between the rear and the front of the cart 100 in a direction from back to front of the cart 100 so as to define a sloped hill along the top of the side wall of the lower basket 110. Furthermore, the rear height of the side wall of the lower basket 110 is visibly greater than the rear height of the side wall of the upper basket 106. In some embodiments, the height of the side wall of the lower basket 110 in the rear is approximately 25% greater than the height of the side wall of the upper basket 106 in the rear. The height of the lower basket 110 in the rear provides greater enclosure for taller articles placed in the cargo area of the lower basket 110.

Figure 34:
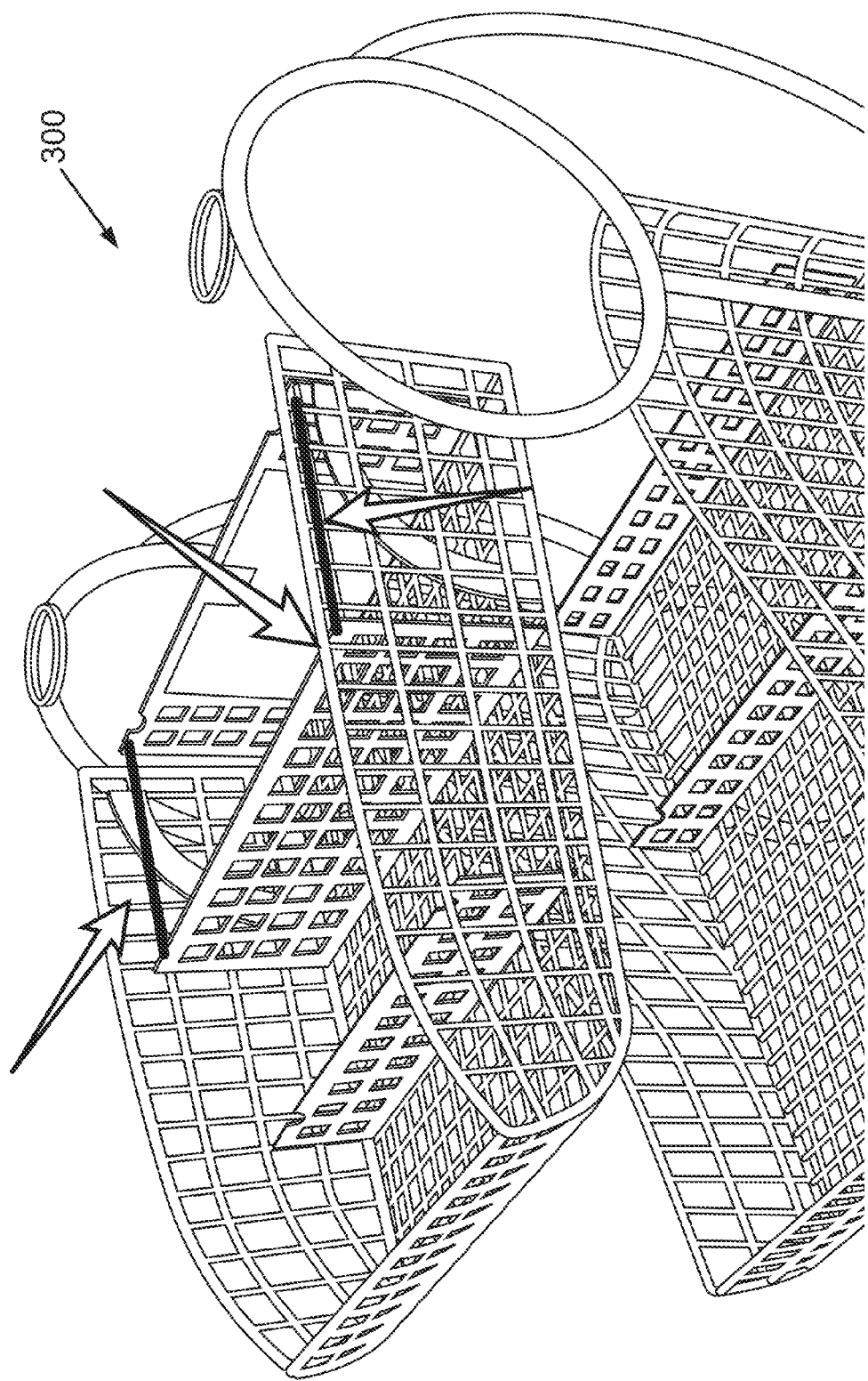
FIG. 34 is a close-up perspective view of part of the cart of FIG. 27 schematically illustrating high side walls providing enclosure for the seating area of the upper basket of the cart.
Figure 35:
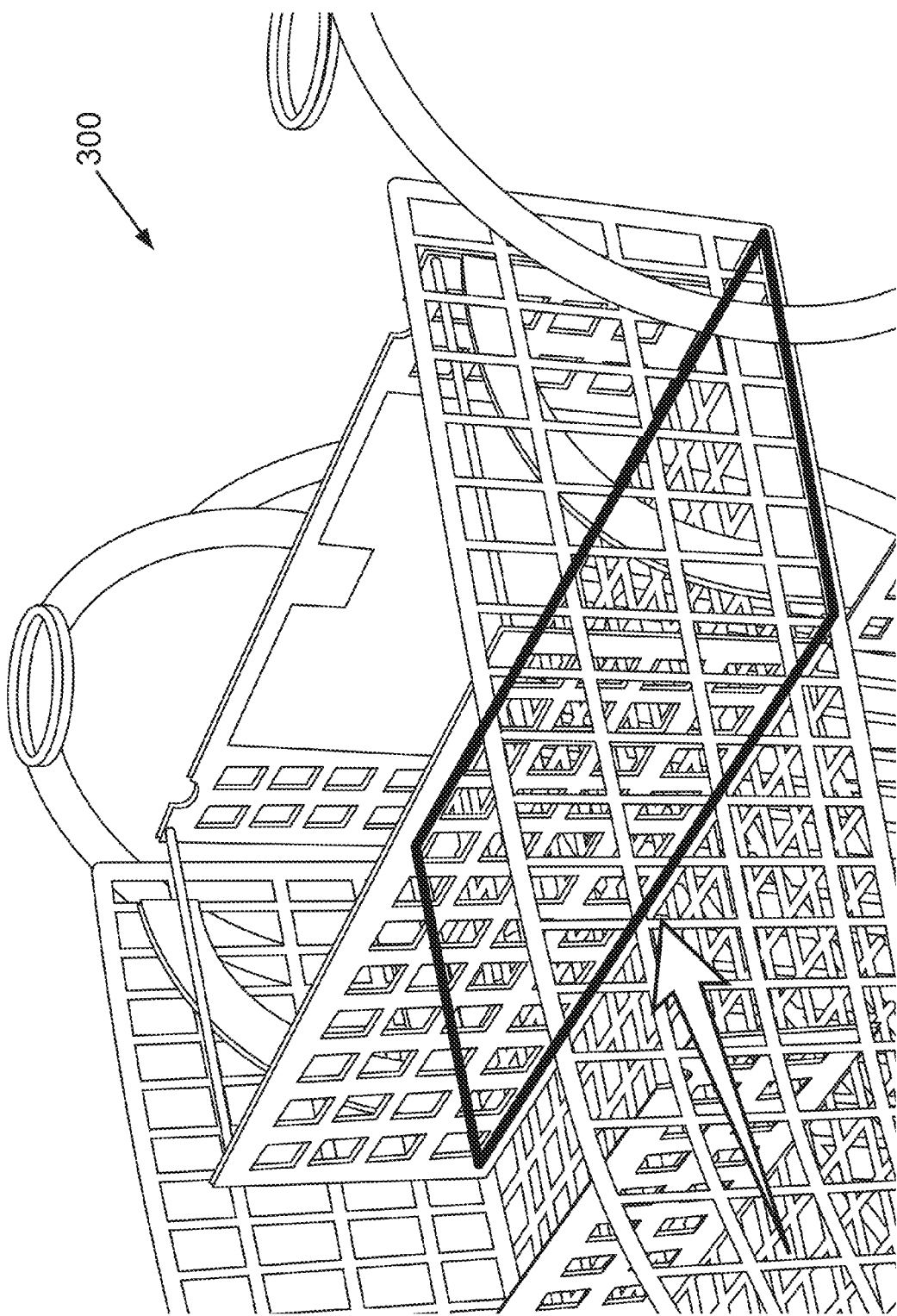
FIG. 35 is a close-up perspective view of part of the cart of FIG. 27 schematically illustrating the seating area of the upper basket of the cart.

The rear area of the upper basket 106 preferably defines a seat for an infant weighing up to 35 lbs. Being in the rear of the upper basket 106, the infant is designed to be located in close proximity to the person pushing the cart. Snap-and-lock straps (now shown) preferably are included with the cart 100 for securing the infant. High side walls of the upper basket 106 in the rear area further secure the infant. This is represented in FIG. 34, which schematically illustrates the high side walls providing enclosure to the infant seating area of the upper basket of the cart 300 (described in detail below). Moreover, FIG. 35 also illustrates the infant seating area of cart 300, which is representative of the infant seating area of cart 100.

With continuing reference to cart 100, two leg openings 146 defined in the rear wall of the upper basket 106 are provided through which the legs of the infant may be extended. A gate 148 serving as a compartment divider is provided for forming two compartments in the cargo area 108 of the upper basket 106 for separating articles placed in the upper basket 106 from the infant seating area. While the gate 148 may be fixed in position to the upper basket 106 and not movable, preferably the gate 148 is connected to a bottom of the upper basket 106 for pivoting movement relative thereto, and may be attached by one or more hinges to the bottom of the upper basket 106. Alternatively other mechanisms can be utilized in place of the one or more hinges so long as the gate is configurable between a generally upstanding position, in which the gate 148 divides and compartmentalizes the cargo area, and a generally stowed position, in which the gate 148 does not divide and compartmentalize the cargo area. A hinged seat covering (not shown) that is pivotal on the rear wall of the upper basket 106 further may be provided for compartmentalized use of the infant seating area as an area for receiving articles when an infant is not seated there. Such a hinged seat covering is disclosed and described below with reference to cart 200 and cart 300.

Figure 29:
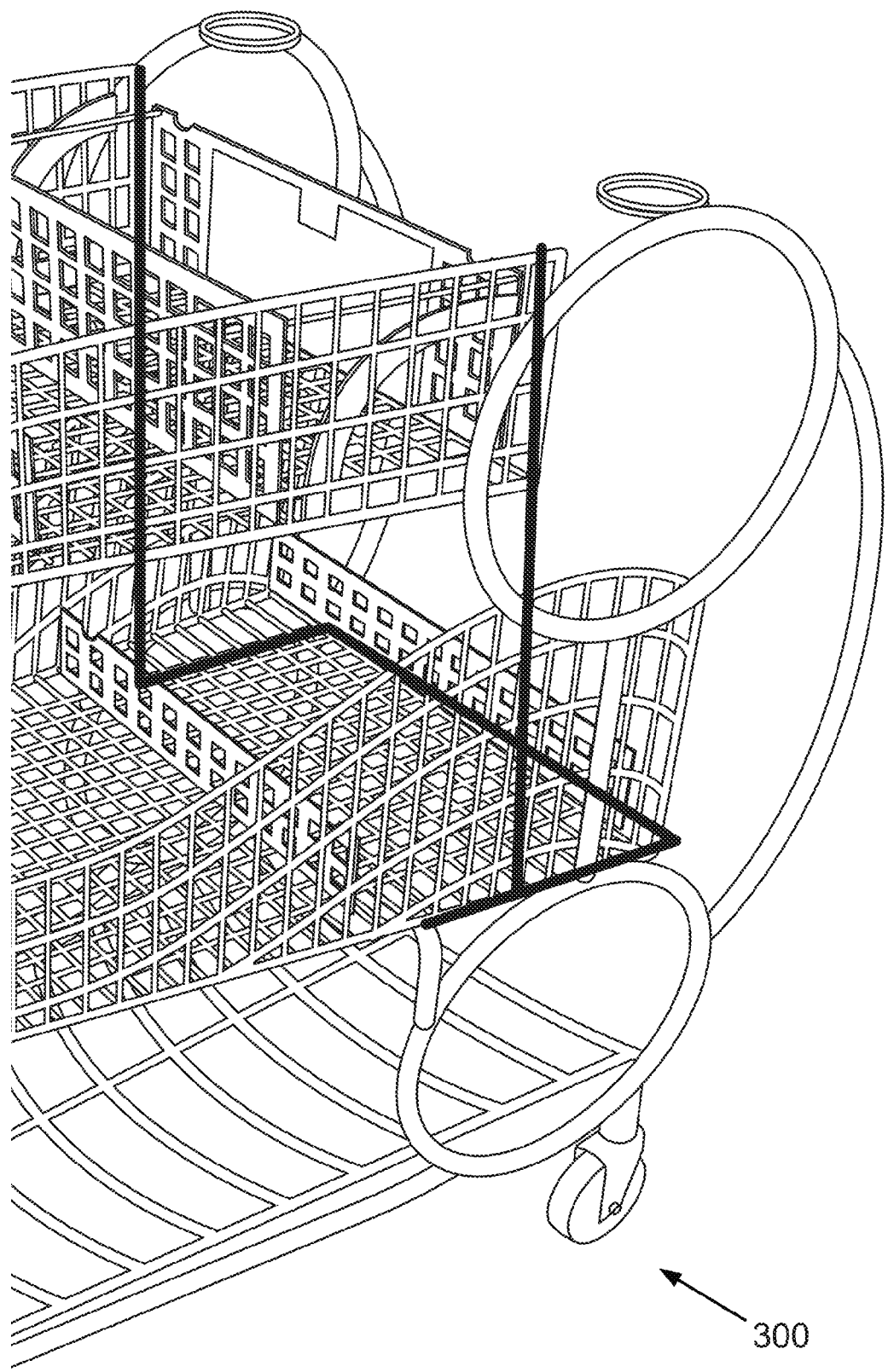
FIG. 29 is a close-up perspective view of part of the cart of FIG. 27 schematically illustrating the offset of the upper basket to the lower basket of the cart.

Similar to the upper basket, the lower basket 110 also defines a seating area at a rear area thereof. The seat of the lower basket 110 preferably is designed for a toddler weighing over 35 lbs rather than an infant weighing under 35 lbs. In this respect, the rear wall 150 of the lower basket 110 preferably folds down onto the floor of the lower basket 110 into a flattened position. The rear wall 150 preferably is attached at a bottom edge thereof to the floor of the lower basket 110 by one or more hinges. Alternatively other mechanisms can be utilized in place of the one or more hinges so long as the rear wall 150 is able to transition between an upward position and a folded position. When in the upstanding position, the rear wall 150 prevents articles from rolling or otherwise falling out of the lower basket 110 during shopping. Furthermore, when pushed against during nesting of carts (discussed below), the rear wall 150 collapses on impact to fold down. When the rear wall 150 is folded to the floor, the resulting edge of the lower basket 110 thereby is made available for use as a ledge for sitting of a toddler. Furthermore, the horizontal offset of the rear of the upper basket 106 relative to the rear of the lower basket 110 provides the clearance by which a toddler can sit up when seated on the ledge of the lower basket 110 when the rear wall 150 thereof is folded to the floor. Such offset of the upper basket 106 to the lower basket 110 is represented by the green lines in FIG. 29, which shows the offset of the upper basket to the lower basket in the cart 300.

A toddler seated in the seating area of the lower basket 110 on the ledge thereof can be secured with a snap-and-lock strap (not shown). Moreover, the height of the side wall of the lower basket 110 at the rear thereof provides significant enclosure for a toddler sitting in the seating area of and on the ledge of the lower basket 110. It also will be appreciated that because the lower basket 110 is located substantially below the upper basket 106, the toddler's proximity to the ground is greater than that of a toddler when placed into a large shopping basket of a traditional cart, thereby providing greater safety should the toddler fall. Moreover, it is believed that the design of the carts of the present invention discourage toddlers from being placed in the upper basket.

Figure 30:
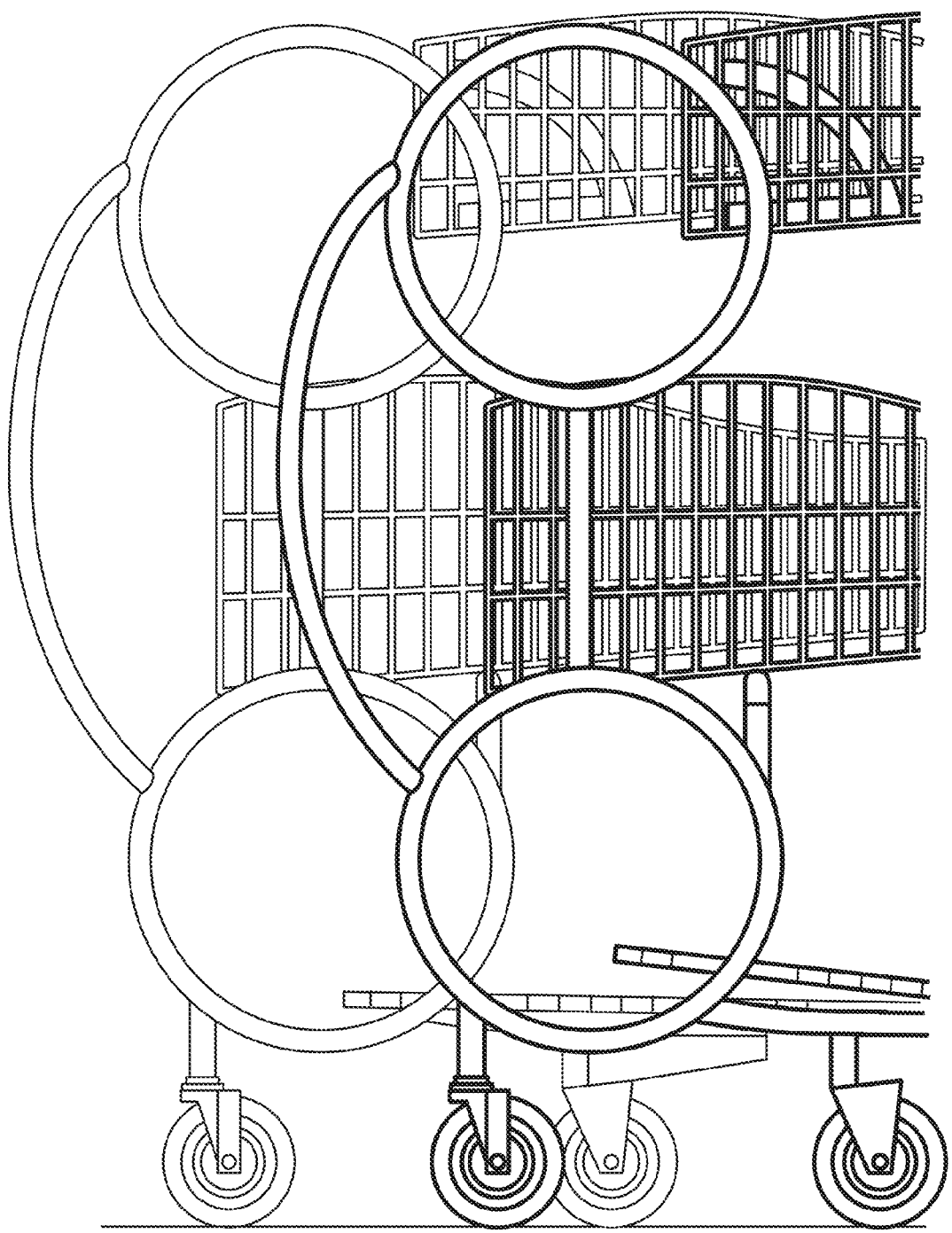
FIG. 30 illustrates a nesting arrangement of carts in accordance with a preferred embodiment of the present invention.

The cart 100 is designed and configured to nest front-to-rear with other like carts. The nesting is accomplished by pushing the front of a first one of the carts into the rear of a second one of the carts such that the upper basket of the first cart is received within the upper basket of the second cart, and the lower basket of the first cart is received within the lower basket of the second cart. When nesting, a rear wall of the upper basket of the second cart collapses in response to the front of the upper basket of the first cart being pushed there against, and a rear wall of the lower basket of the second cart collapses in response to the front of the lower basket of the first cart being pushed there against. A resulting nesting arrangement is illustrated in FIG. 30. It is believed that when nested, the distance from the rear of cart to the front of the cart in which it is nested is shorter than nesting of convention shopping carts, thereby resulting in a greater number of carts that can be stored together in a given area compared to conventional carts.

Figure 31:
FIG. 31 is a perspective view of a conventional shopping cart including a push bar.
Figure 32:
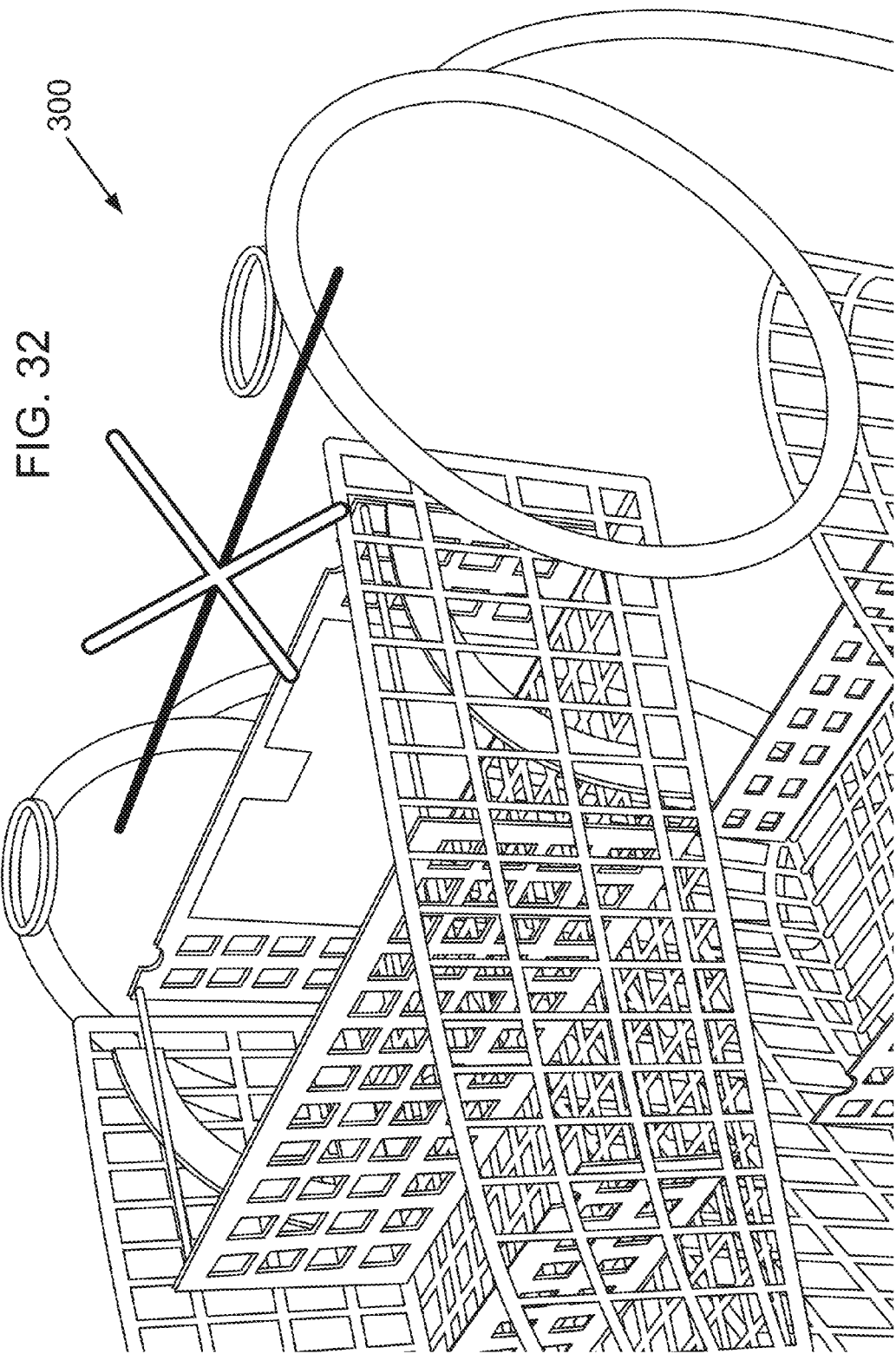
FIG. 32 is a close-up perspective view of part of the cart of FIG. 27 schematically illustrating the omission of a push bar in a preferred embodiment of the present invention.

From the foregoing detailed description of cart 100 and corresponding drawings, it will be appreciated that the cart 100 includes no widthwise push bar in a rear of the cart for pushing of the cart by a person, as conventionally would be expected of a shopping cart. Such a push bar is illustrated in FIG. 31, illustrating a conventional shopping cart of the prior art, and the omission of the push bar in at least some embodiments of the present invention is schematically illustrated in FIG. 32. By omitting the push bar, unobstructed access by a person is provided to both the upper basket and the lower basket from the rear of the cart. Moreover, omission of the push bar facilitates provision and use of the two seats as disclosed herein. These benefits are perhaps best seen in FIG. 6 illustrating a perspective view of the rear of the cart 100.

From the foregoing detailed description of cart 100 and corresponding drawings, it will further be appreciated that there is no push bar extending laterally across the rear of the cart by which a person might grab and push the cart. Such a push bar is believed to interfere with and otherwise impede the ease of loading of the baskets in the shelf-like system. It is believed that removal of the push bar allows for complete access to the open baskets at the rear of the cart for loading of articles into either of the baskets while shopping from the same vantage point of pushing the cart. This requires fewer steps by the person in stepping around from the rear of the cart and enables the person to better focus on shopping from one item to the next. This also makes shopping in crowded aisles easier, as a person does not have to step out from the rear of the cart to a side of the cart.

It will further be appreciated that the omission of the conventional push bar allows for an easier and more natural way of steering the cart. Curved handles on each side of the cart extend between and connect respective upper ring handles and lower ring handles and are configured and dimensioned such that the curved handles extend toward opposite lateral sides of a person standing at the rear of the cart. The curved handles and upper and lower ring handles are located generally over the rear wheels of the cart. The side position of the curved handles, including the upper handle rings, allow for shoppers of any height to push the cart comfortably by gripping and pushing the cart. It further will be appreciated that gripping and steering the cart at the rear sides thereof make steering and control of the cart easier. The design also permits for full and open access to the baskets similar to shelves in a home pantry. Such an open backside also prevents steering in horizontal position, which is believed to be unnatural. People tend to walk with their hands at their sides, and pushing in such a relaxed position with their hands vertical to their sides, palms faced toward each other, is believed to be more conducive for slower pace shopping experiences.

In use, the cart 100 features convenience in loading. In particular, the two baskets 106,110 are stacked in spaced, vertical relation, with the rear of the baskets being offset from one another at the rear of the cart. A person pushing the cart usually stands at the rear of the cart, and the two baskets present a shelf-like system for ease of loading of articles by the person at the rear of the cart.

Figure 11:
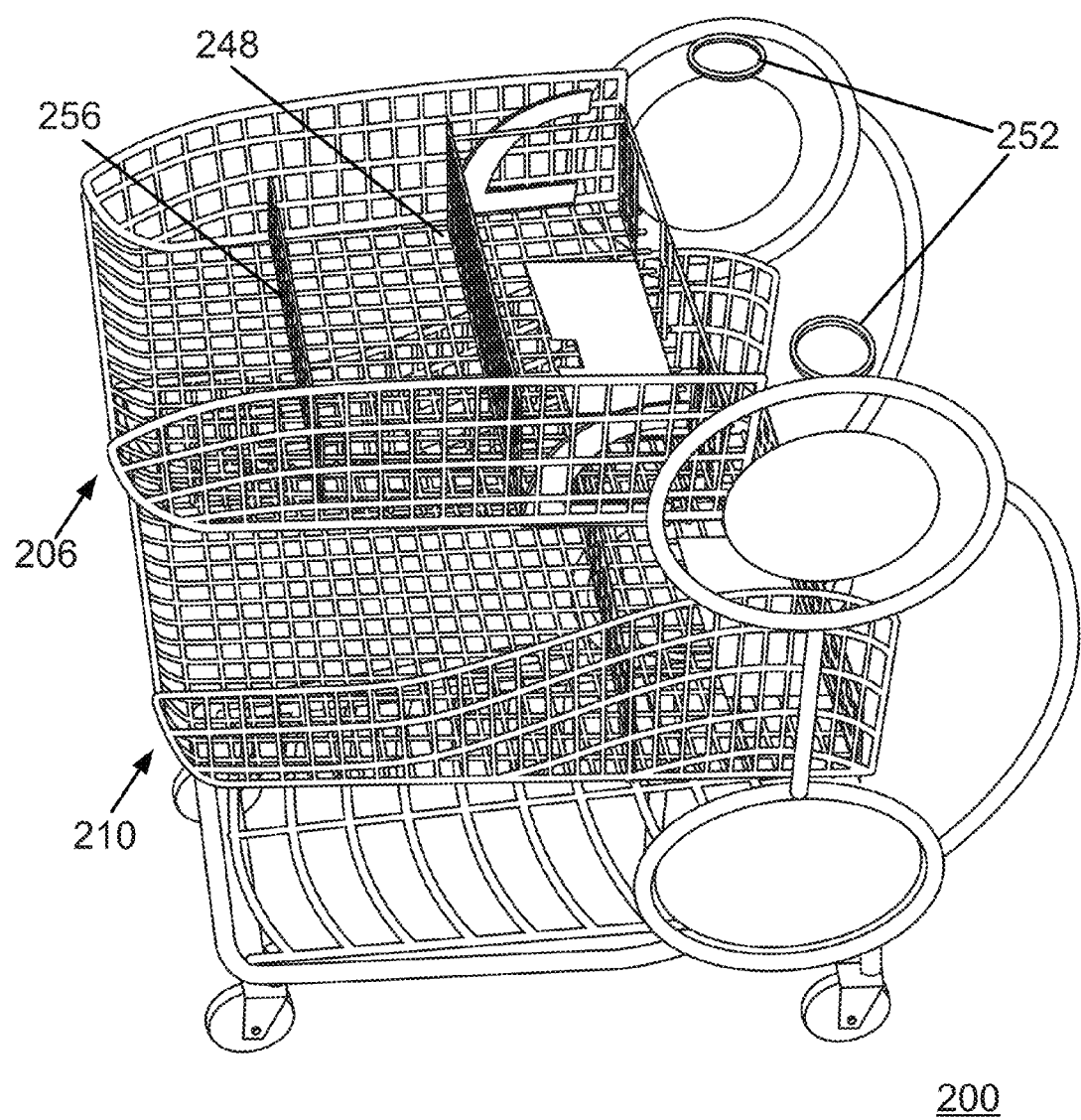
FIG. 11 is a perspective top left side view of the cart of FIG. 10.
Figure 12:
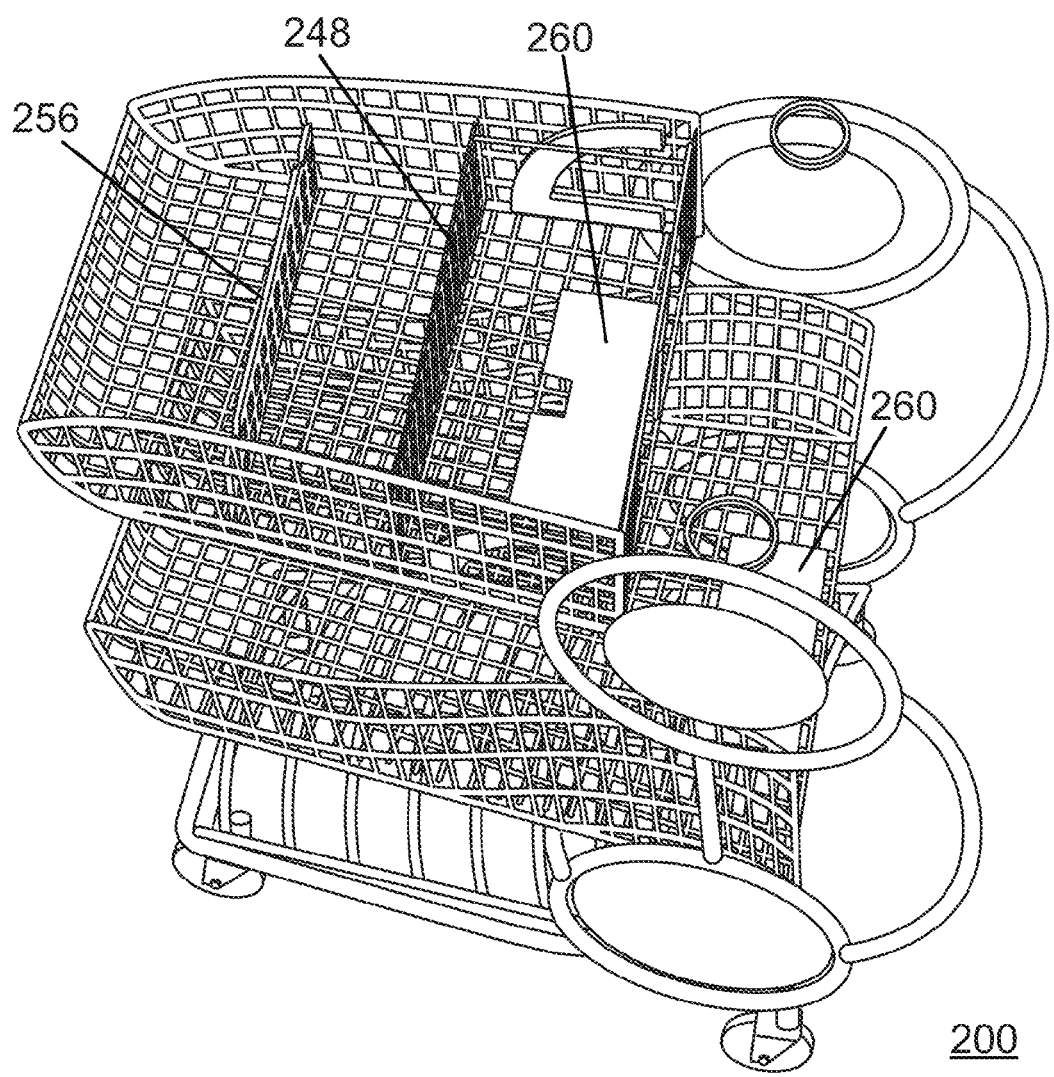
FIG. 12 is a perspective top left back view of the cart of FIG. 10.
Figure 13:
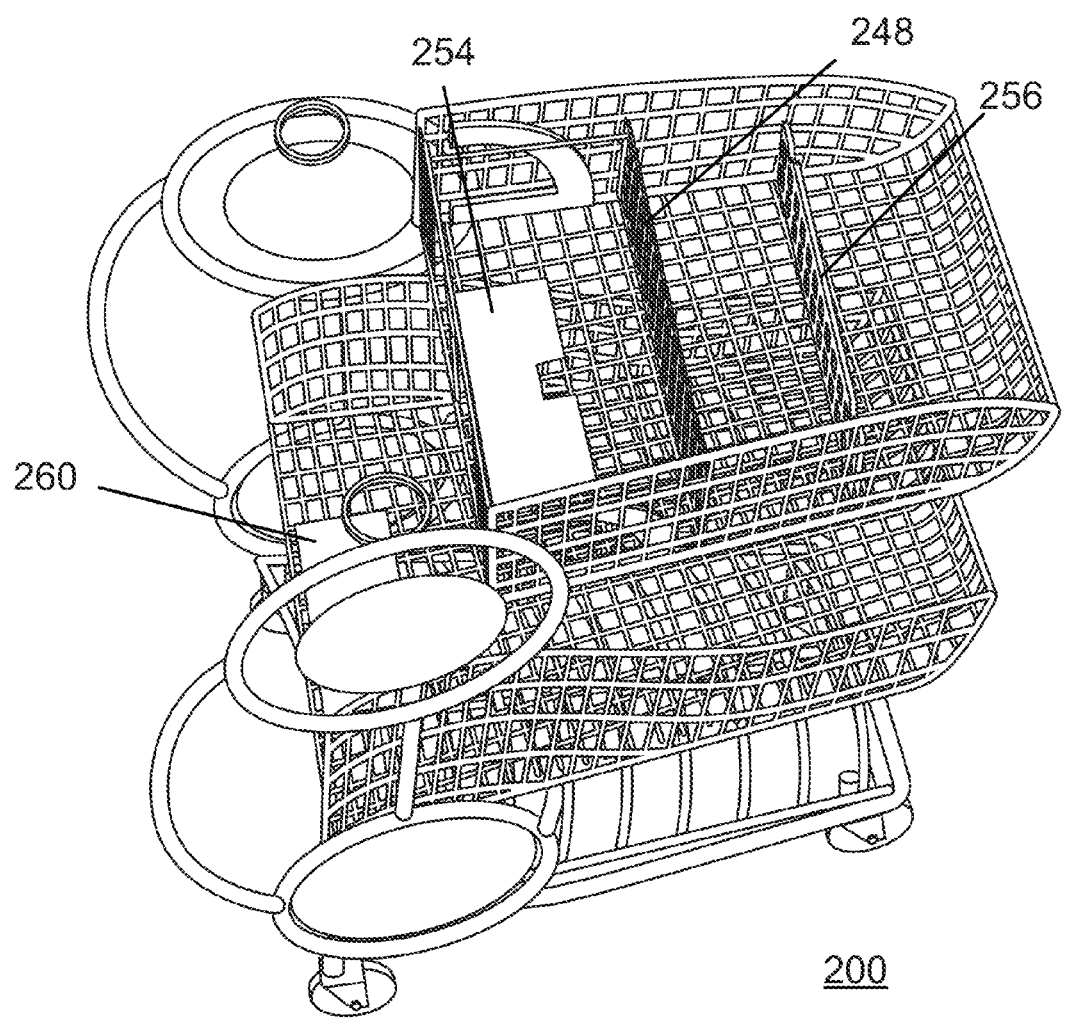
FIG. 13 is a perspective top right back view of the cart of FIG. 10.
Figure 14:
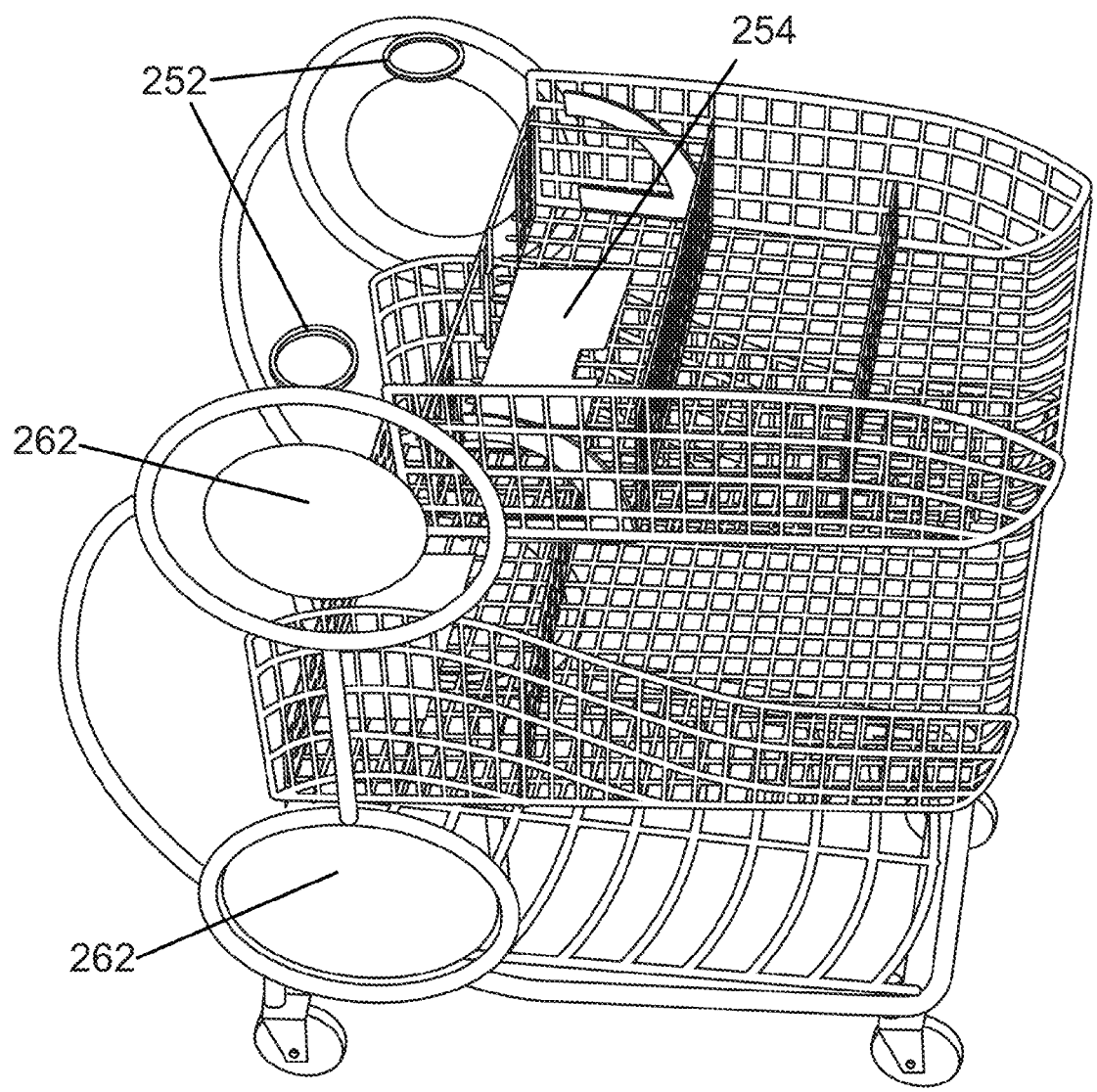
FIG. 14 is a perspective top right side view of the cart of FIG. 10.
Figure 15:
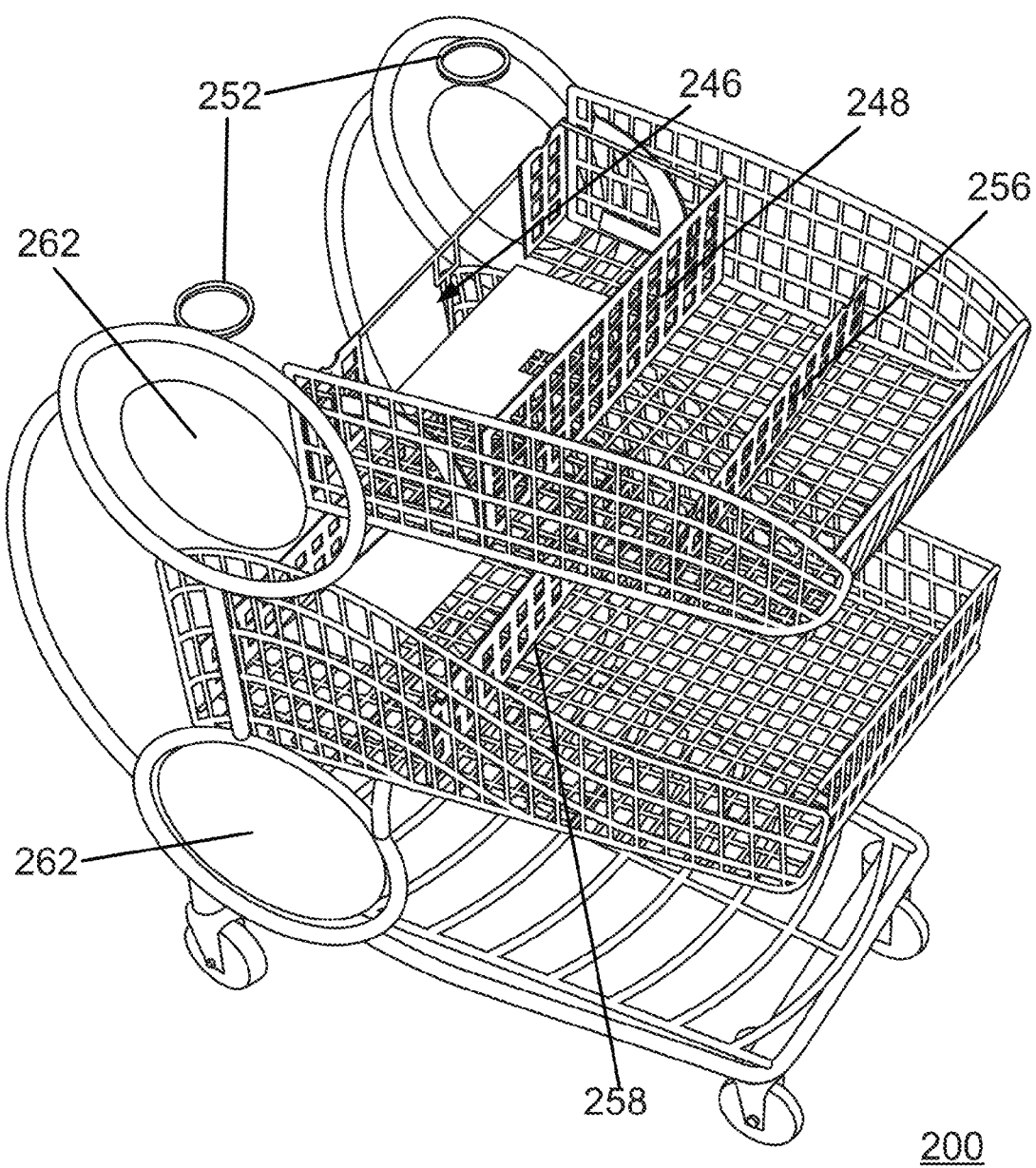
FIG. 15 is a perspective top right front view of the cart of FIG. 10.
Figure 16:
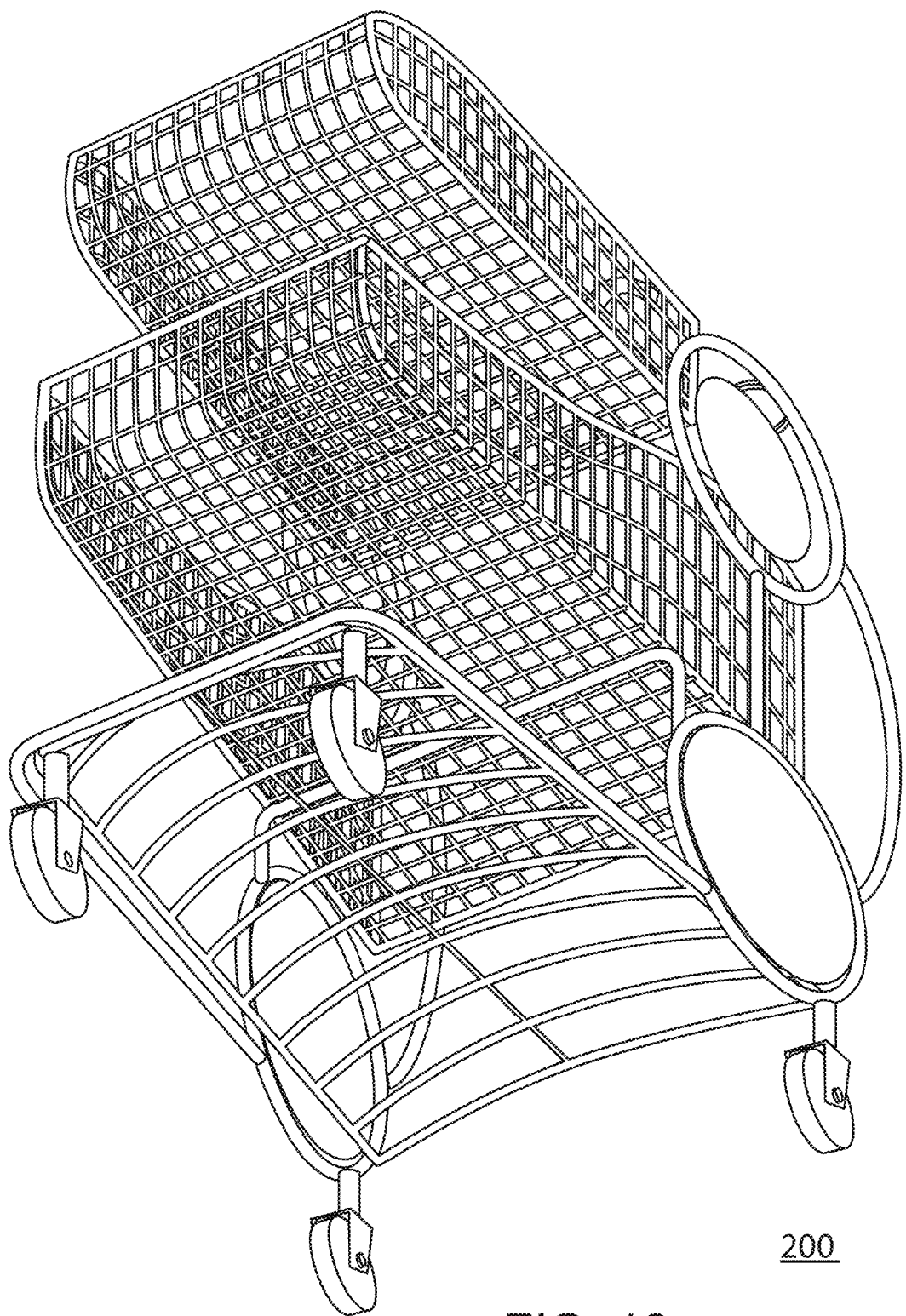
FIG. 16 is a perspective bottom left front view of the cart of FIG. 10.
Figure 17:
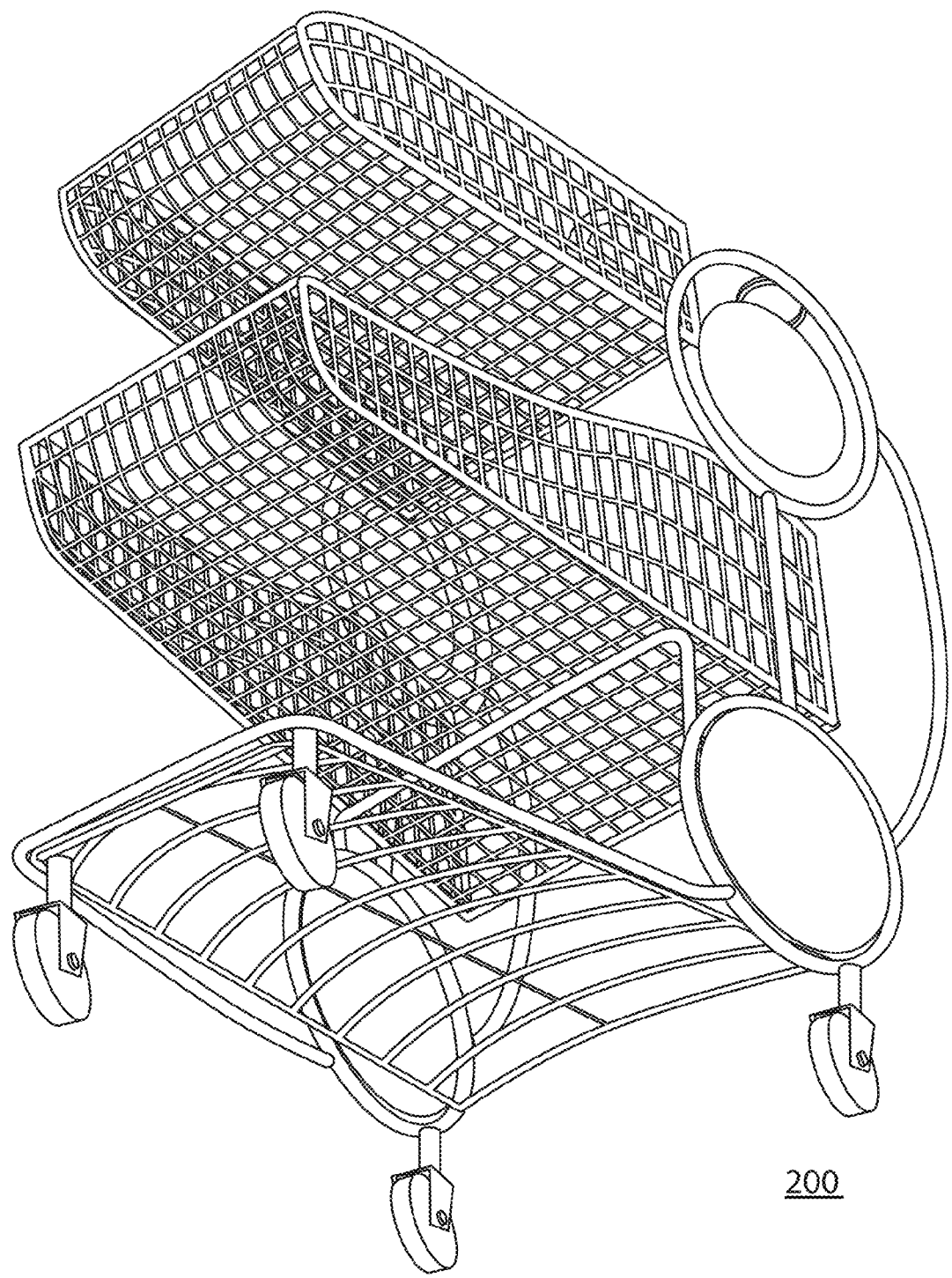
FIG. 17 is another perspective bottom left front view of the cart of FIG. 10.
Figure 18:
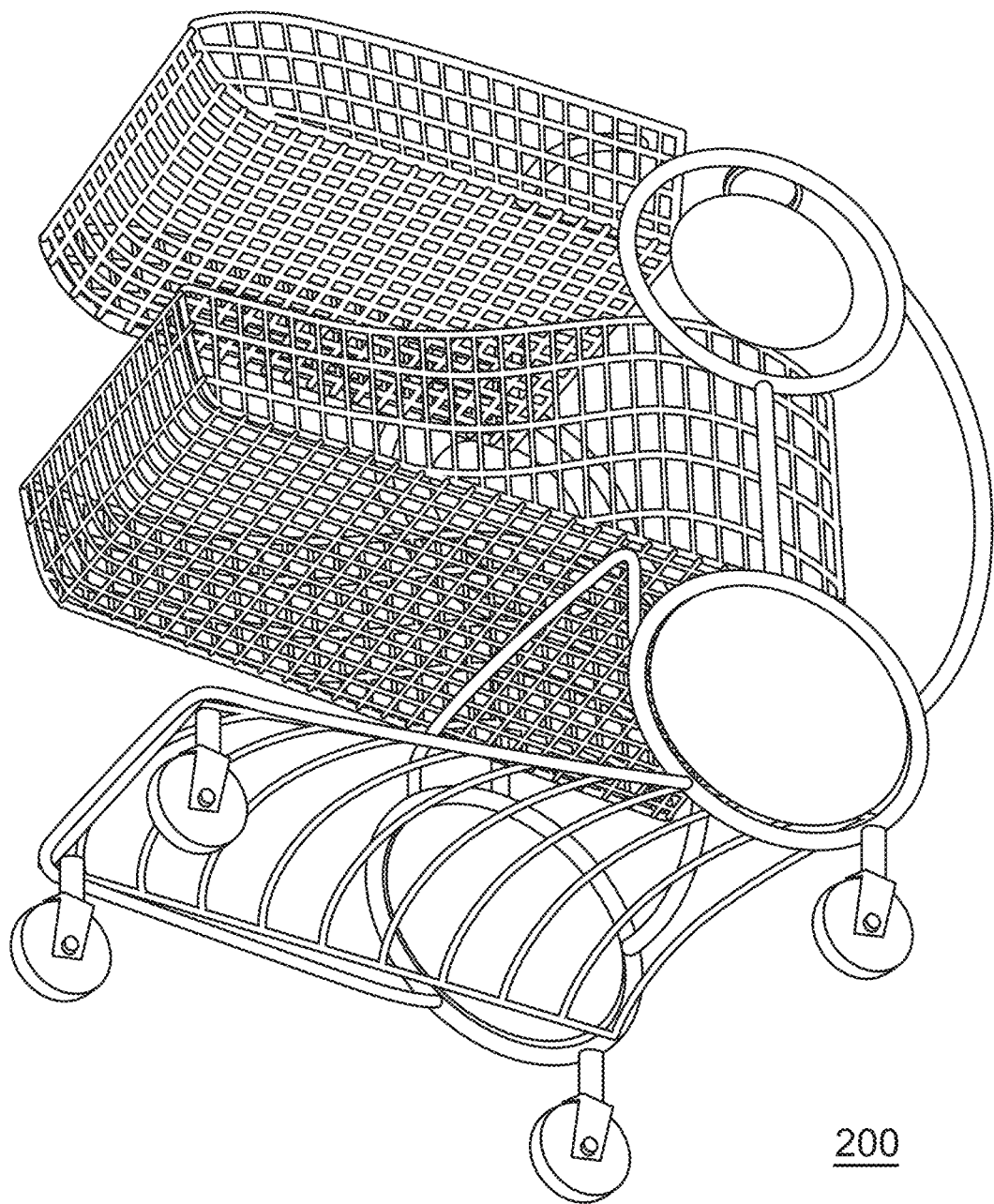
FIG. 18 is a perspective bottom left side view of the cart of FIG. 10.
Figure 19:
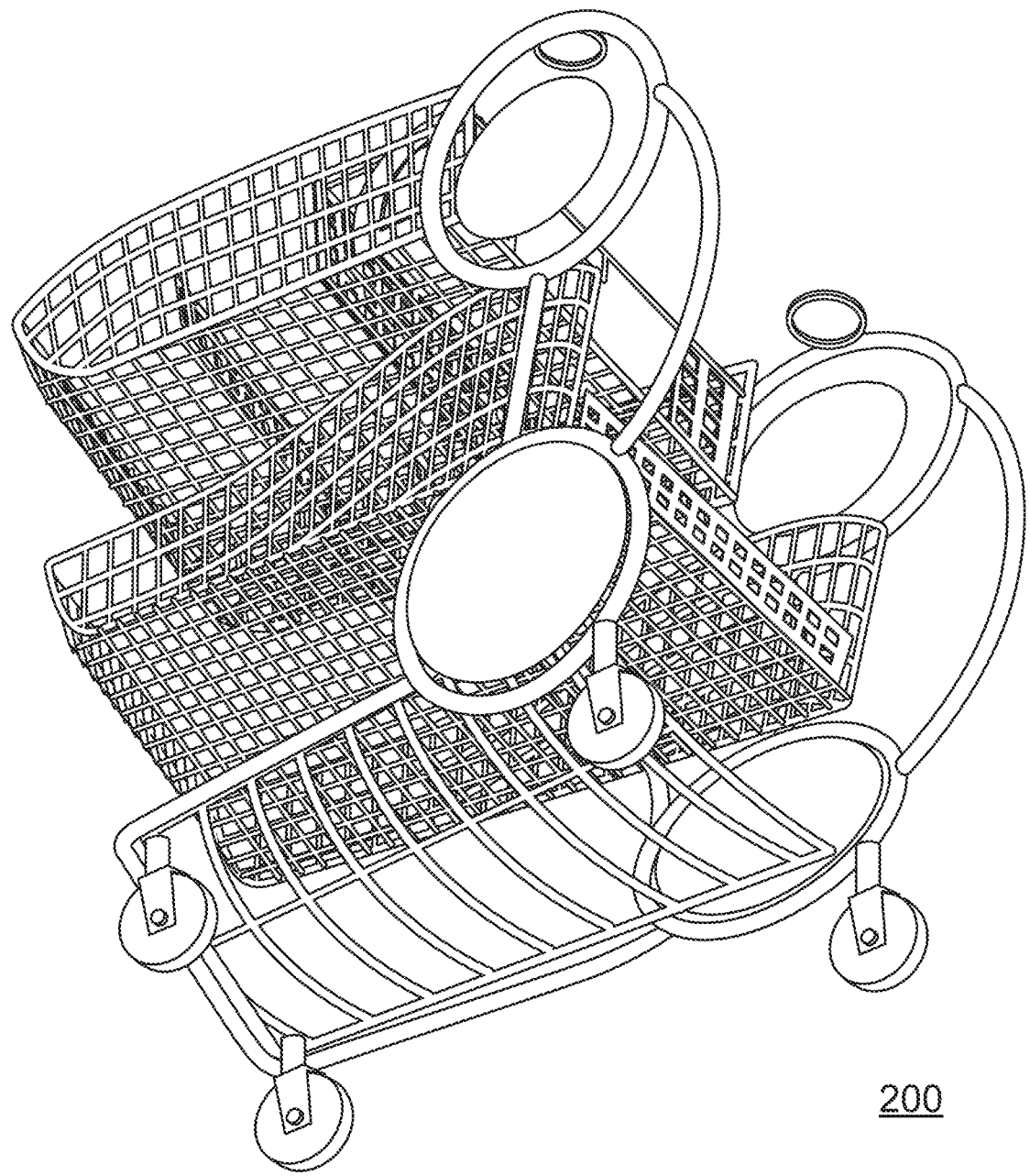
FIG. 19 is a perspective bottom left back view of the cart of FIG. 10.
Figure 20:
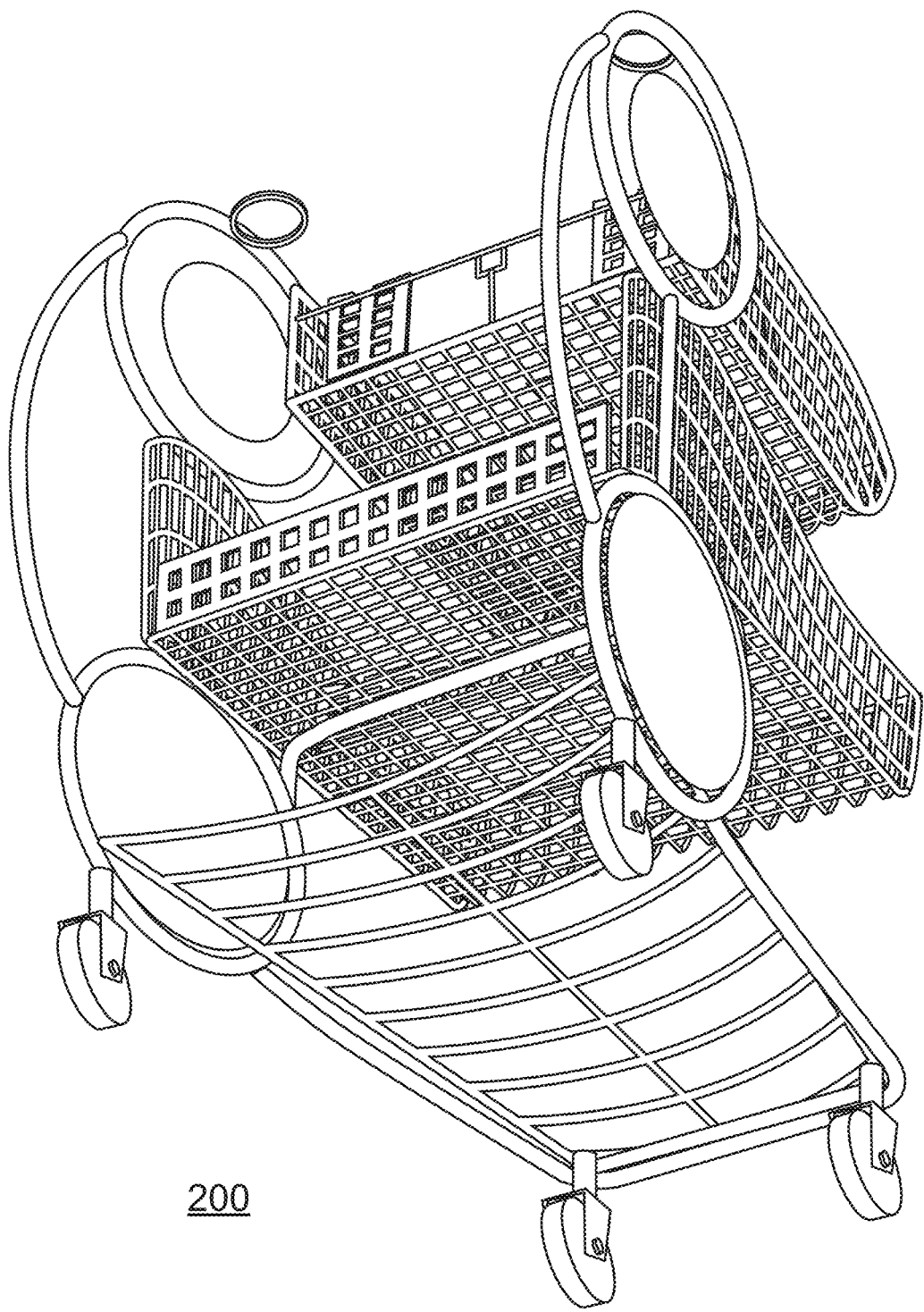
FIG. 20 is a perspective bottom right back view of the cart of FIG. 10.
Figure 21:
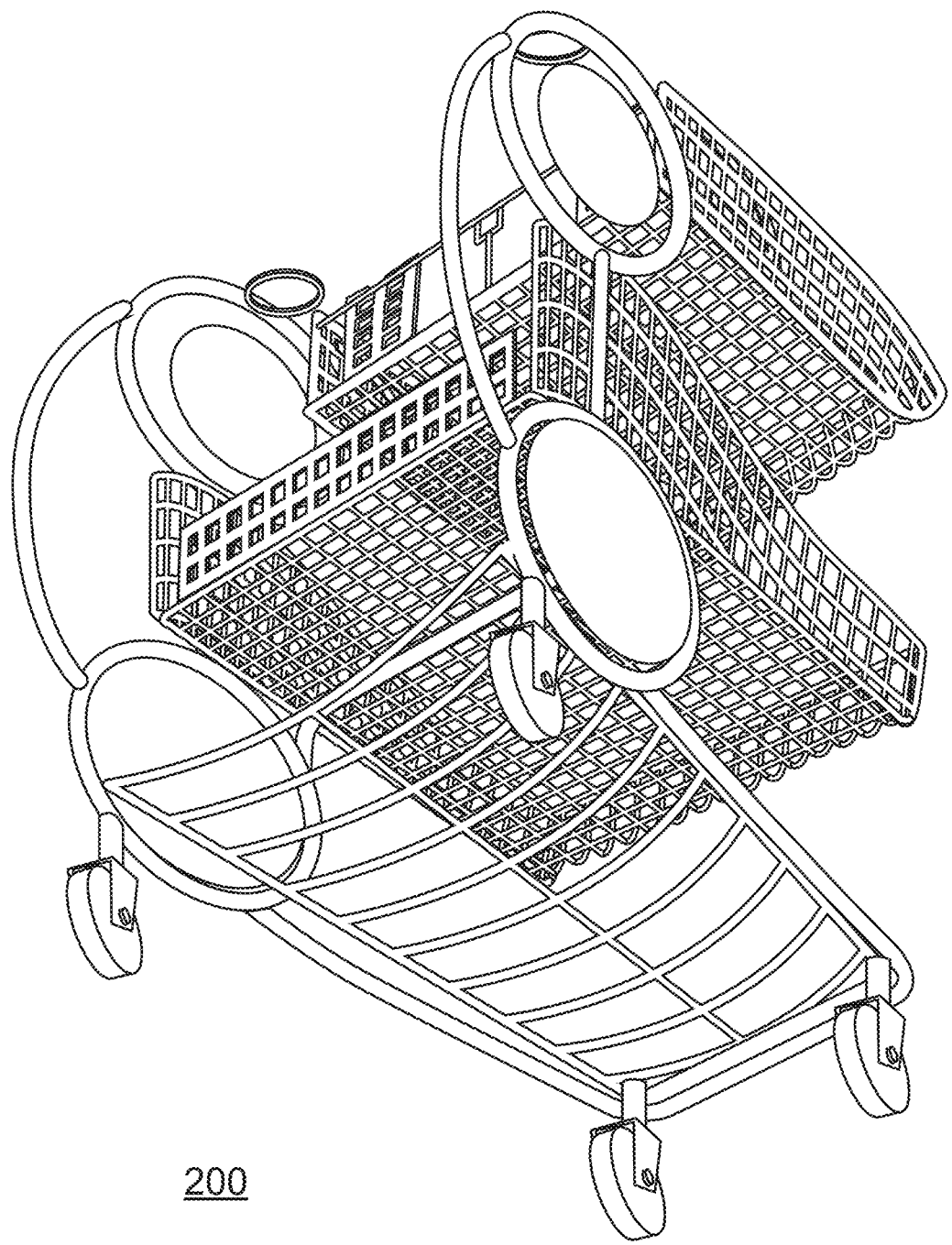
FIG. 21 is another perspective bottom right back view of the cart of FIG. 10.
Figure 22:
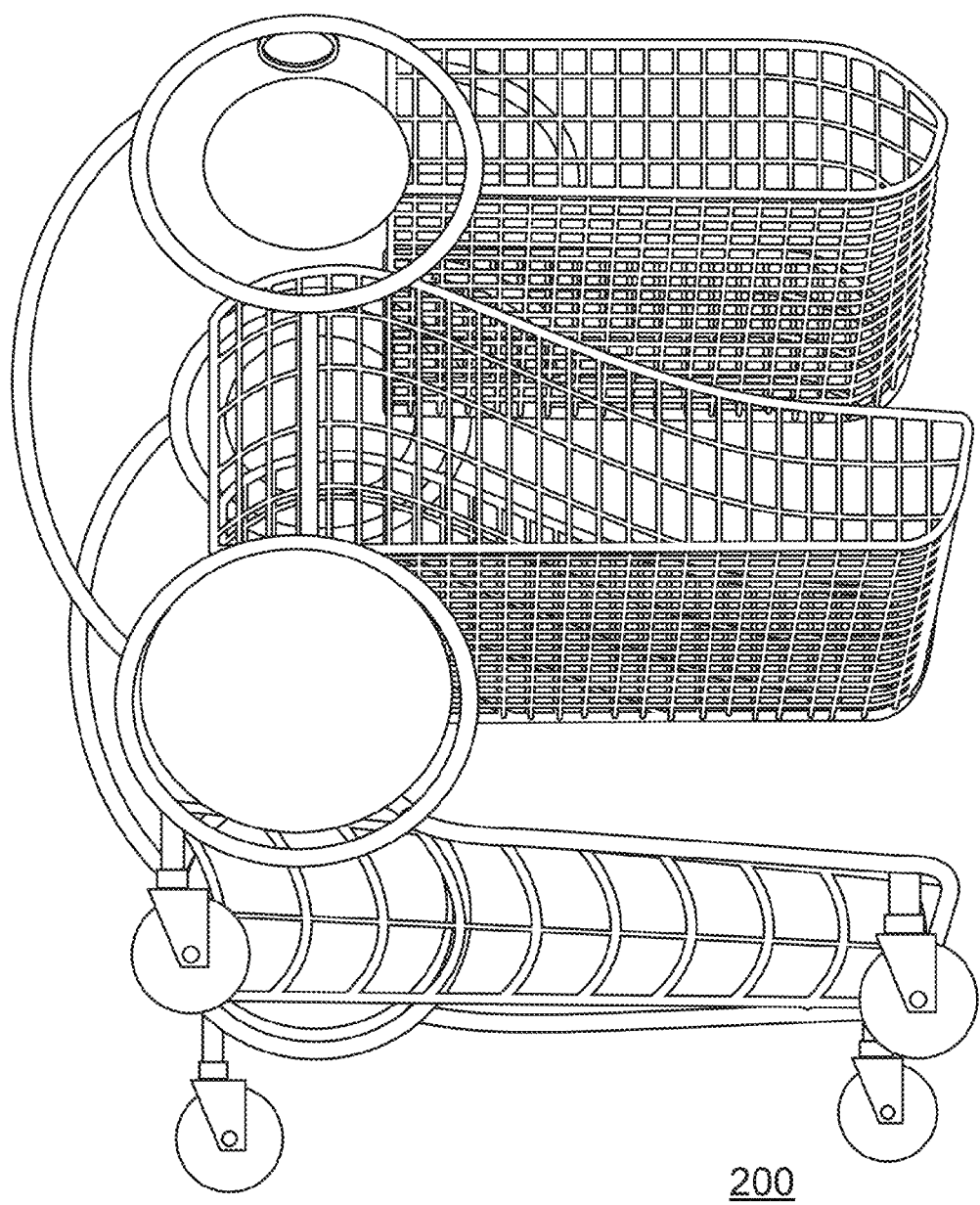
FIG. 22 is a perspective bottom right side view of the cart of FIG. 10.
Figure 23:
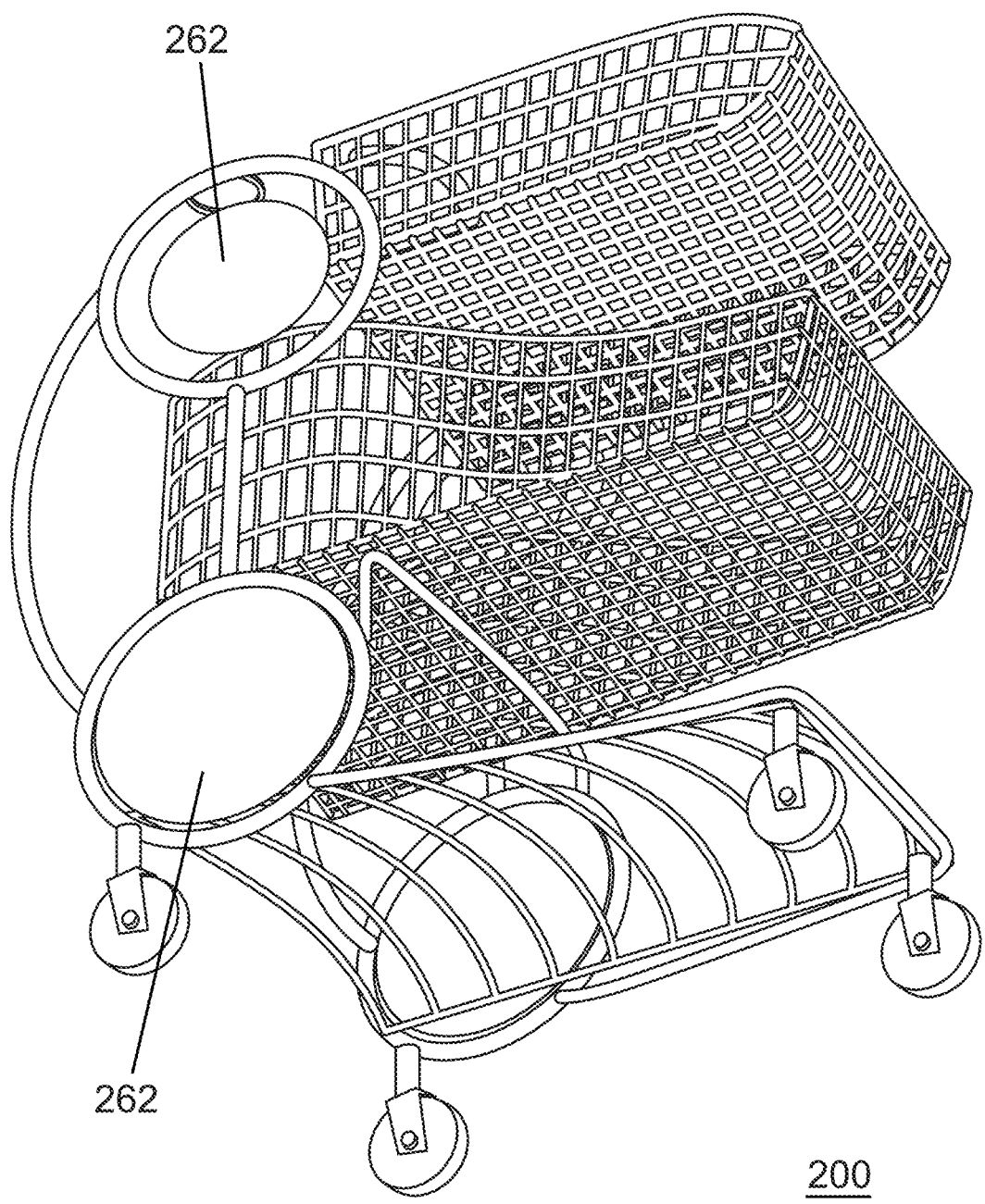
FIG. 23 is a perspective bottom right front view of the cart of FIG. 10.
Figure 24:
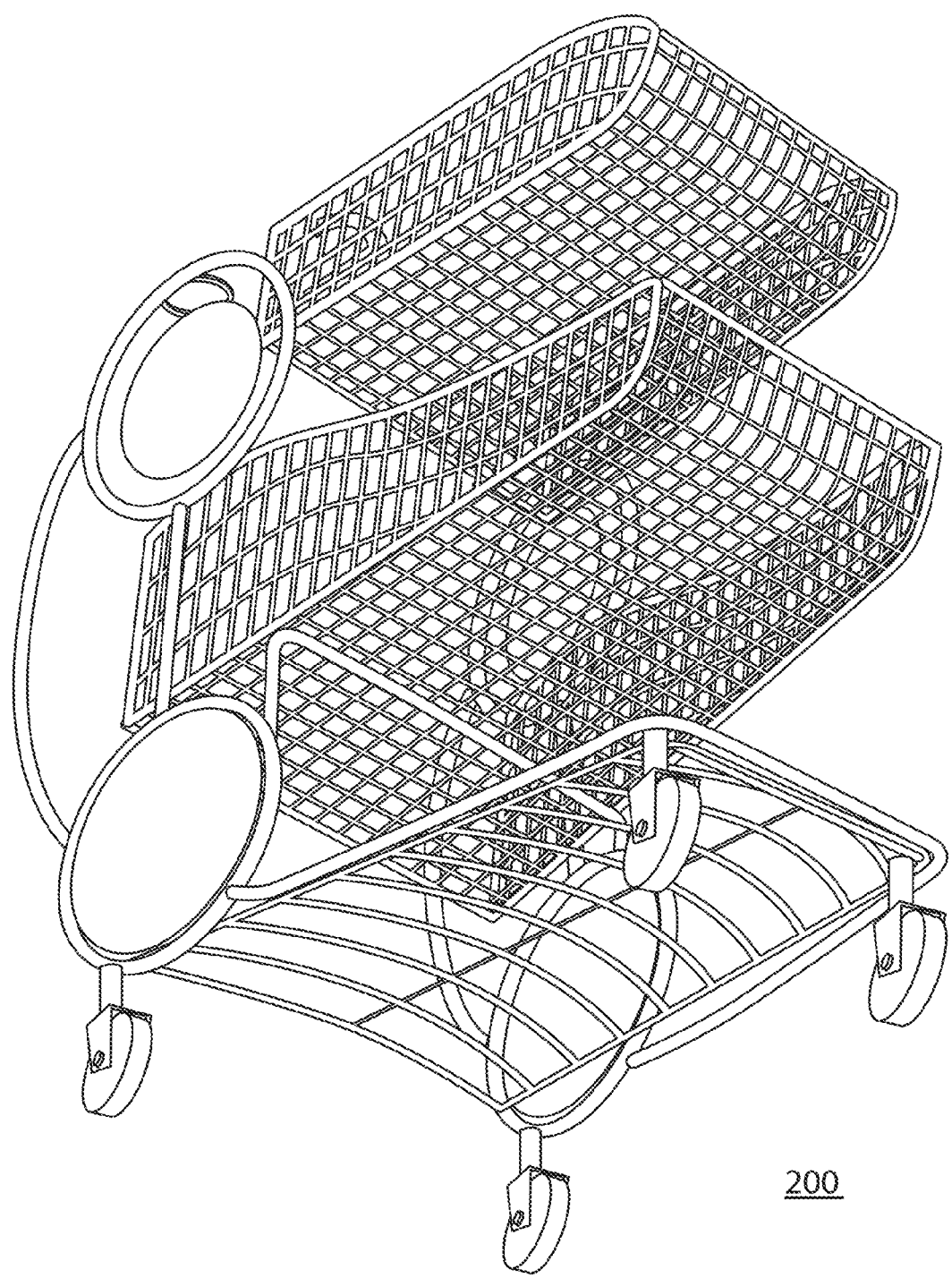
FIG. 24 is another perspective bottom right front view of the cart of FIG. 10.
Figure 25:
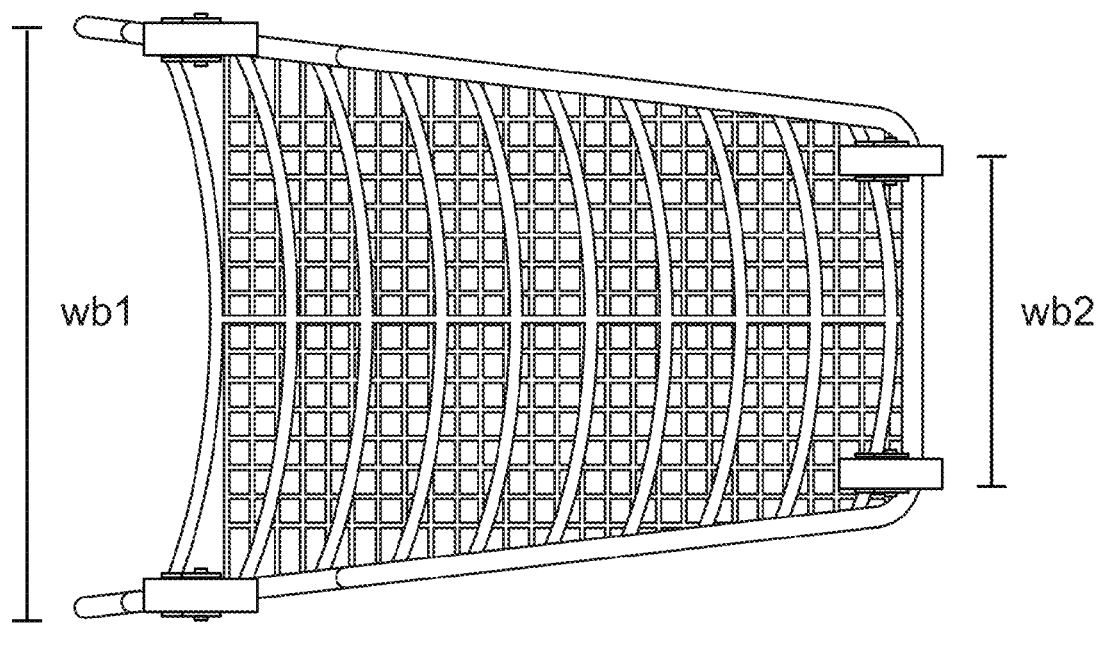
FIG. 25 is a perspective view of the bottom of the cart of FIG. 10.
Figure 26:
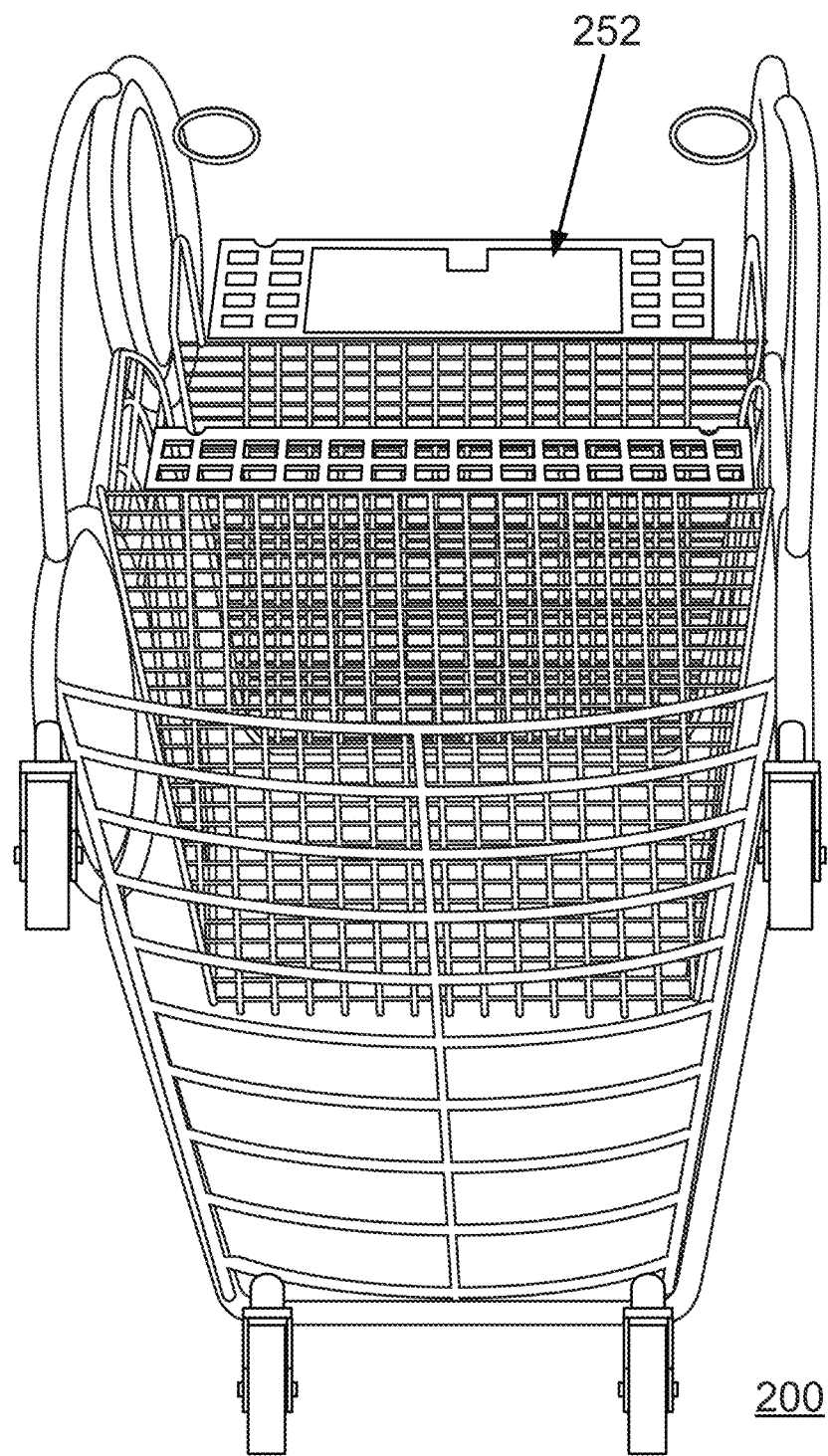
FIG. 26 is a perspective bottom rear view of the cart of FIG. 10.

Turning now to FIGS. 10-26, FIG. 10 is a perspective top left front view of a cart 200 in accordance with another embodiment of the present invention; FIG. 11 is a perspective top left side view of the cart 200; FIG. 12 is a perspective top left back view of the cart 200; FIG. 13 is a perspective top right back view of the cart 200; FIG. 14 is a perspective top right side view of the cart 200; FIG. 15 is a perspective top right front view of the cart 200; FIG. 16 is a perspective bottom left front view of the cart 200; FIG. 17 is another perspective bottom left front view of the cart 200; FIG. 18 is a perspective bottom left side view of the cart 200; FIG. 19 is a perspective bottom left back view of the cart 200; FIG. 20 is a perspective bottom right back view of the cart 200; FIG. 21 is another perspective bottom right back view of the cart 200; FIG. 22 is a perspective bottom right side view of the cart 200; FIG. 23 is a perspective bottom right front view of the cart 200; FIG. 24 is another perspective bottom right front view of the cart 200; FIG. 25 is a perspective view of the bottom of the cart 200; and FIG. 26 is a perspective bottom rear view of the cart 200.

The structure and functionality of cart 200 is similar to that of cart 100, and therefore just the primary differences will be described for purposes of brevity.

As seen in FIGS. 10-26, the cart 200 comprises one or more cup holders 252. Each cup holder 252 is attached to a chassis of the cart 200 at the uppermost part of the cart 200, namely, at upper handles 214,218. Such positioning of the cup holders provides for easy placement of a drink of a shopper without the shopper being obstructive to the mechanics of operating the cart. Nor do the cup holders inhibit nesting of the carts 200.

Figure 33:
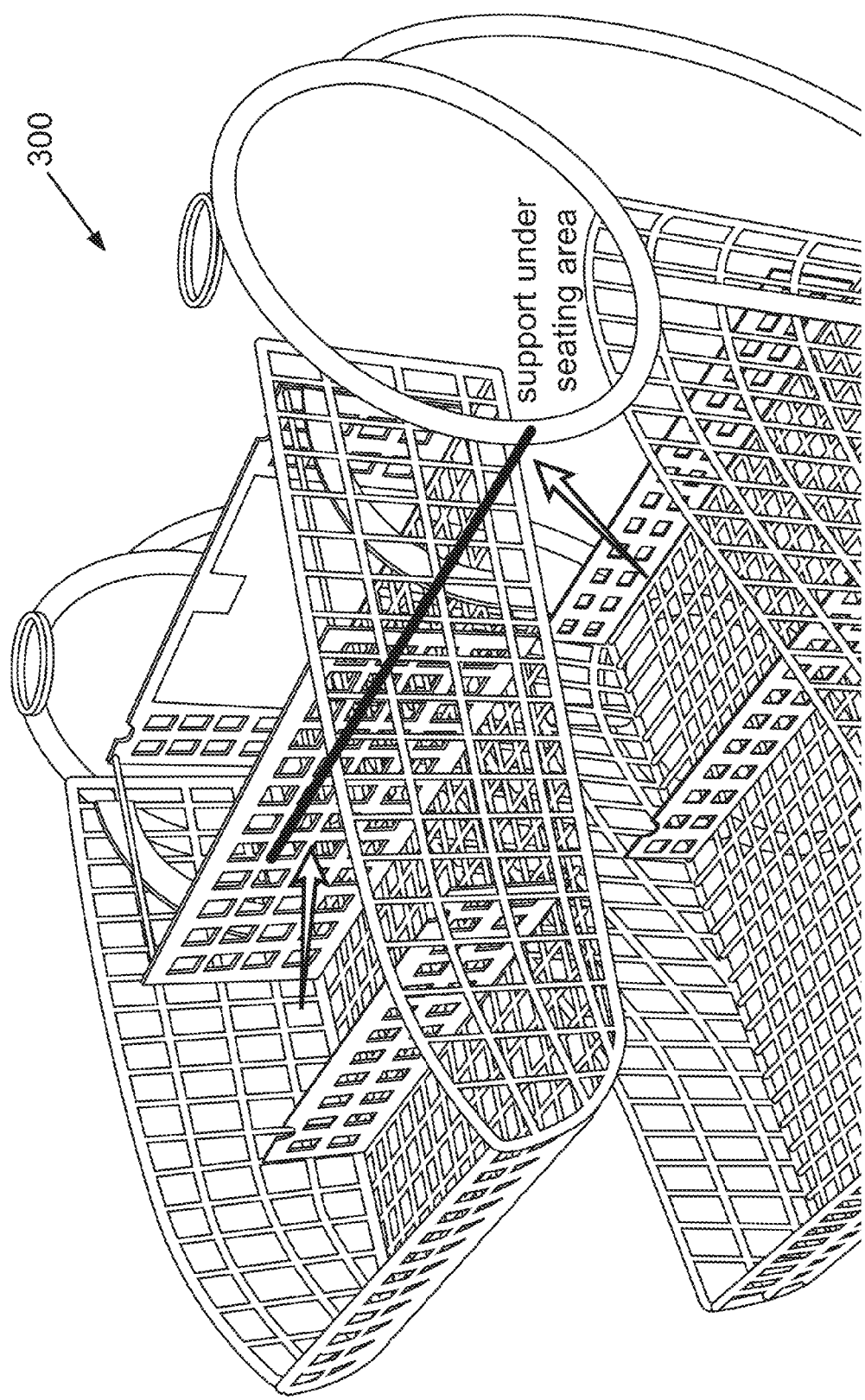
FIG. 33 is a close-up perspective view of part of the cart of FIG. 27 schematically illustrating the widthwise elongate support member that extends under and directly engages and supports the upper basket beneath the seating area of the upper basket.

Regarding upper basket 206, the rear area of the upper basket 206 defines a seat for an infant weighing preferably up to 35 lbs. Being in the rear of the upper basket 206, the infant is designed to be located in close proximity to the person pushing the cart. Snap-and-lock straps (now shown) preferably are included with the cart 200 for securing the infant. High side walls of the upper basket 206 in the rear area further secure the infant. Furthermore, the widthwise elongate member 230, which extends between the handles 214,218 in contact with the underneath of the upper basket 206, is located closer to the rear of the upper basket than in cart 100 and, in fact, underlies the infant seating area. This is schematically illustrated in FIG. 33.

An opening 246 for accommodating the infant's legs is defined in the rear wall of the upper basket 206, and a gate 248 serving as a compartment divider is provided for forming two compartments in the cargo area of the upper basket 206 for separating articles placed in the upper basket 206 from the infant seating area. While the gate 248 may be fixed in position to the upper basket 206 and not movable, preferably the gate 248 is connected to a bottom of the upper basket 206 for pivoting movement relative thereto, and may be attached by one or more hinges to the bottom of the upper basket 206. Alternatively other mechanisms can be utilized in place of the one or more hinges so long as the gate is configurable between a generally upstanding position, in which the gate 248 divides and compartmentalizes the cargo area, and a generally stowed position, in which the gate 248 does not divide and compartmentalize the cargo area. A hinged seat covering 254 also is provided that is pivotal on the rear wall or floor of the upper basket 206 and further may be provided for compartmentalized use of the infant seating area as an area for receiving articles when an infant is not seated there; such hinged seat covering 254 prevents articles from falling through the leg opening 246.

An additional gate 256 is provided that serves to compartmentalize the cargo area of the upper basket 206 for separating articles placed in the upper basket 206. The gate 256 preferably lifts and slides in place to provide adequate compartmentalization of articles, facilitating for example grocery grouping. The gate 256 may be connected to a bottom of the upper basket 206 for pivoting movement relative thereto. In this respect, the gate 256 may be attached by one or more hinges to the bottom of the upper basket 206. Alternatively other mechanisms can be utilized in place of the one or more hinges so long as the gate 256 is configurable between a generally upstanding position, in which the gate further divides and compartmentalizes the cargo area of the upper basket 256, and a generally stowed position, in which the gate 256 does not further divide and compartmentalize the cargo area of the upper basket 206. In like manner, the lower basket 210 includes a similar gate 258 that divides and compartmentalizes the cargo area of the lower basket 210.

Regarding the toddler seat of the lower basket 210, a seat covering 260 is attached to the floor of the lower basket 210 in a generally flat orientation against the bottom of the lower basket 210 so as to define a seating area of the toddler seat.

Regarding the upper and lower handles, printed media 262 including promotional advertisements preferably is positioned within the opening areas as schematically illustrated in FIGS. 10-26.

Lastly, the wheel base wb1 in the rear of the cart 200 may be longer than the wheel base wb2 in the front of the cart, as schematically illustrated in FIG. 25. Alternatively, the wheel bases may be approximately the same.

Figure 27:
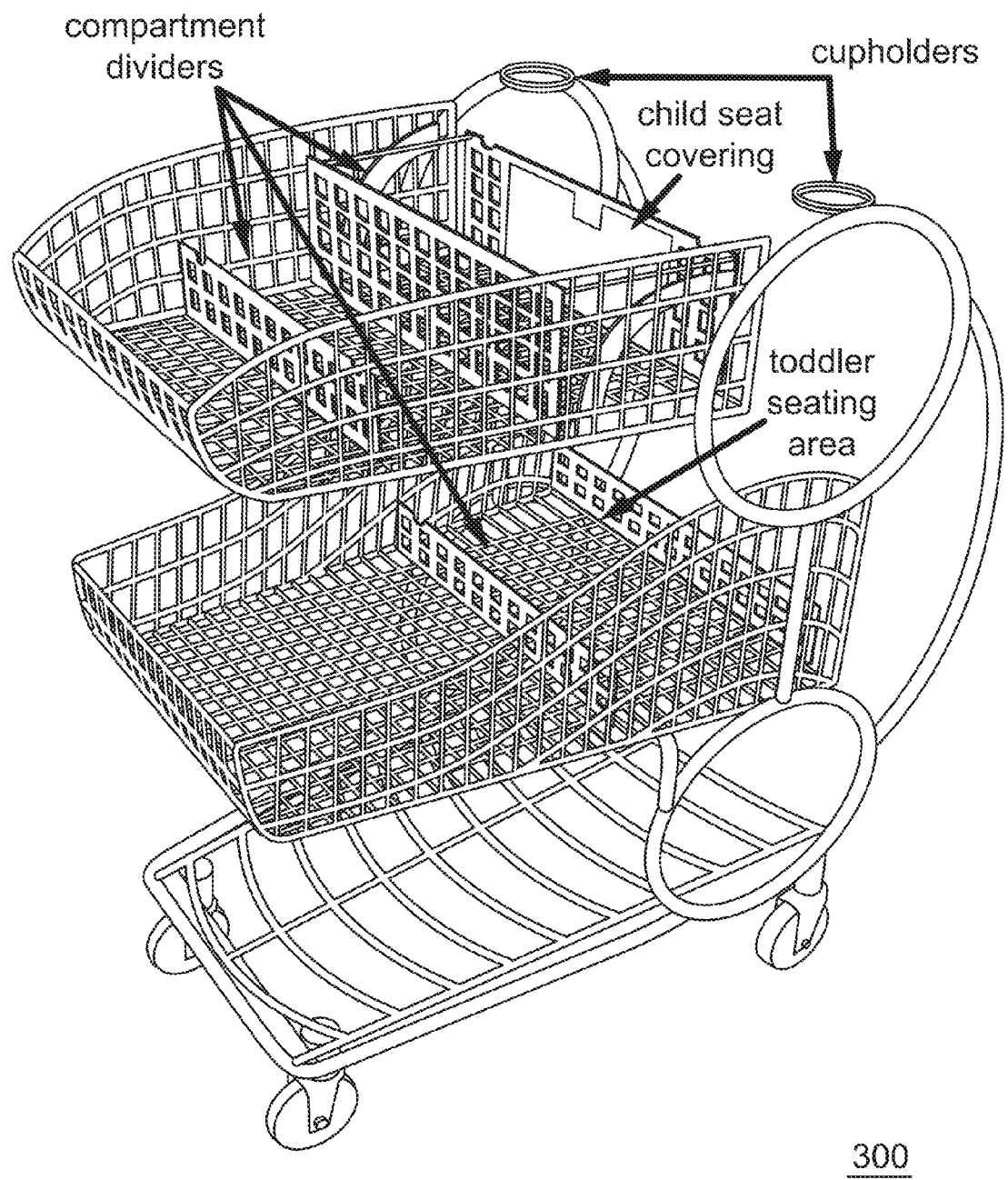
FIG. 27 is a perspective top left side view of a cart in accordance with another embodiment of the present invention.
Figure 28:
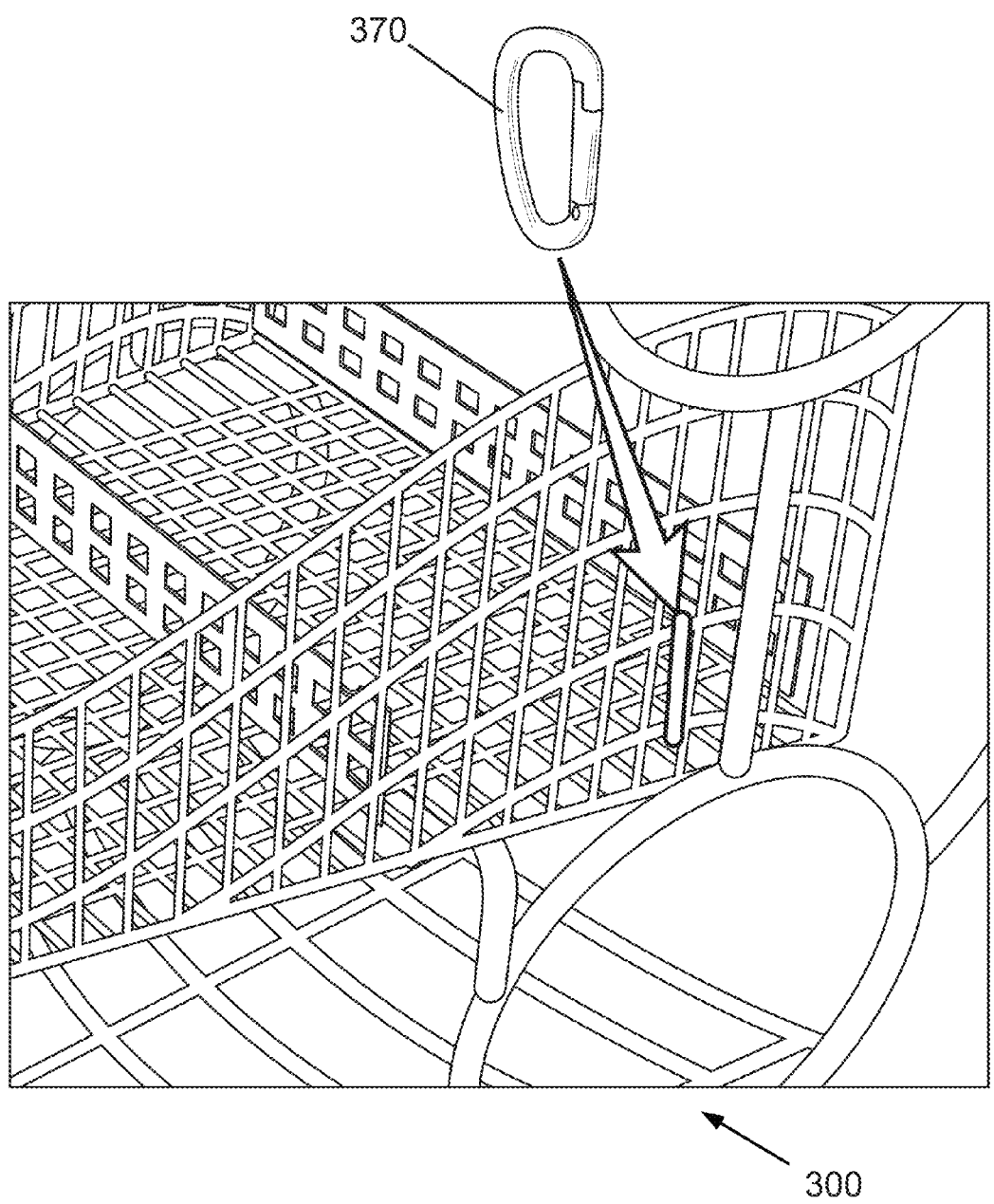
FIG. 28 is a close-up perspective view of part of the cart of FIG. 27 schematically illustrating the attachment of a latching mechanism to the upper basket of the cart.

FIG. 27 is a perspective top left side view of a cart 300 in accordance with another embodiment of the present invention. The structure and functionality of cart 300 is similar to that of cart 100 and 200. Additionally, as schematically illustrated in FIG. 28, the cart 300 comprises a latch 370 located on or attached to the upper basket on a side of the cart 300, whereby a purse or other personal item having a strap or ring can be latched to the cart 300 in a secure location and manner.

Figure 36:
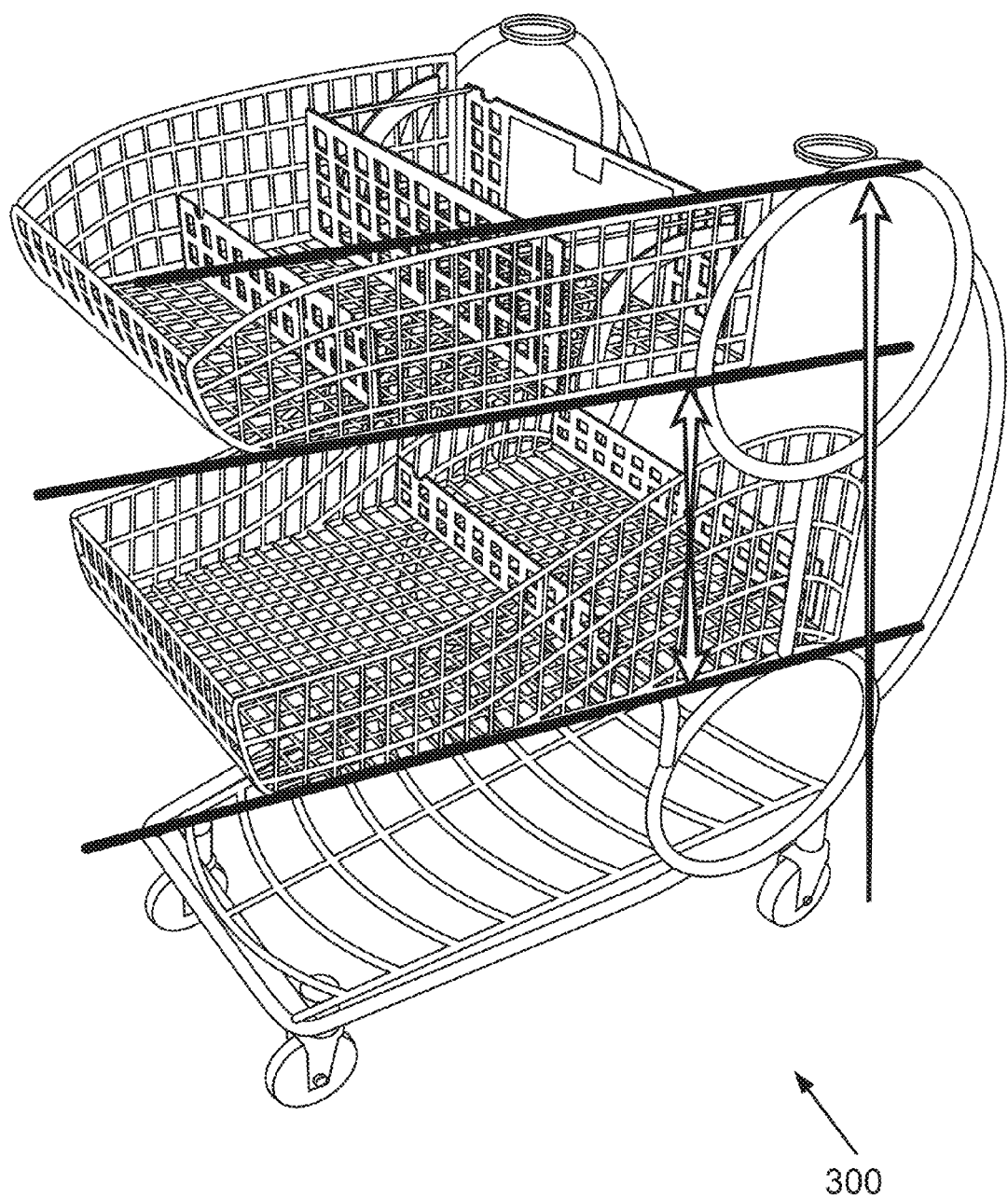
FIG. 36 is a perspective top left side view of the cart of FIG. 27 schematically illustrating the height of the cargo area of the lower basket and the height of the side walls of the upper basket.
Figure 37:
FIG. 37 is a perspective top left side view of the cart of FIG. 27 schematically illustrating the height and footprint of the cart.

The cart is further representative of carts 100,200 and in this respect FIG. 36 schematically illustrates the height of the cargo area of the lower basket and height of the side walls of the upper basket of the cart 300, which is similar to that of carts 100,200; and FIG. 37 schematically illustrates the height and footprint of the cart 300 itself, which is similar to that of carts 100,200.

Carts in accordance with embodiments of the invention are believed to have a smaller footprint while providing larger cargo space than conventional carts. Furthermore, it is contemplated that one or more embodiments of carts of the present invention can be used in many different shopping contexts including, for example, grocery stores, warehouse clubs, home improvement retailers, drug chains and specialty retailers. In each context the distance between the baskets vertically and horizontally, the size of each basket, and even slight modifications to the shape of the baskets can be modified, altered, or changed so as to accommodate the size, shape, and other attributes of items intended to be placed into the carts. For example, a home improvement retailer like The Home Depot may require a smaller upper basket with a larger lower basket in order to handle larger items, while some other retailers might prefer the upper and lower baskets be similar in size. Such modifications are within the scope of the invention.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof. Thus, for example, while the push bar of the prior art is omitted in the illustrated preferred embodiments, it is contemplated that in some embodiments of the invention a push bar is included. Additionally, while the baskets and rack have been described as preferably being formed from wire, it is contemplated within the scope of the invention that any or all of the baskets and rack be formed from plastic in at least some embodiments of the invention; and that any or all of the baskets and rack be made from formed metal in at least some embodiments of the invention. Moreover, it is further contemplated that the chassis be made from plastic or formed metal in at least some embodiments of the invention.

What is claimed is:
1. A cart, comprising:
(a) a chassis;
(b) wheels attached to the chassis for rolling of the cart;
(c) an upper basket attached to the chassis and defining an upper cargo area for receiving articles for transport on the cart; and

(d) a lower basket attached to the chassis and defining a lower cargo area for receiving articles for transport on the cart;

(e) wherein the chassis defines on each of opposite lateral sides of the cart a pair of vertically spaced handles including a top handle for gripping and pushing the cart by a person when standing at a rear of the cart;

(f) wherein an elongate member of the chassis on each side of the cart extends between and connects the pair of handles on the respective side of the cart, is curved and in the shape of an arc in its extent between the pair of handles, and extends beyond a rear of the upper basket and a rear of the lower basket so as to define a rearmost part of the cart on the respective side of the cart;

(g) wherein a rear area of the upper basket provides a seat for an infant; and (h) wherein a rear area of the lower basket provides a seat for a toddler.

2. The cart of claim 1, wherein the chassis comprises an upper widthwise support member on which the upper basket is cantilevered over the lower basket.

3. The cart of claim 2, wherein said upper widthwise support member is the only part of the chassis both that extends the width of the cart, and that is directly connected to and directly supports the upper basket in its cantilevered position over the lower basket.

4. The cart of claim 1, wherein the cart further comprises a rack located under the lower basket, and wherein the rack comprises a wire framework that is bounded at front and sides thereof by the chassis, including a portion of the chassis that defines a U-shaped bottom bumper of the cart that extends around a front and part of the opposite lateral sides of a bottom of the cart.

5. The cart of claim 4, wherein the chassis comprises a lower widthwise support member on which the lower basket is cantilevered over the rack.

6. The cart of claim 5, wherein said lower widthwise support member is the only part of the chassis both that extends the width of the cart, and that is directly connected to and directly supports the lower basket in its cantilevered position over the rack.

7. The cart of claim 1, wherein the top handle on each respective lateral side of the cart defines an uppermost part of the cart on said respective lateral side.

8. The cart of claim 1, wherein each handle of the vertically spaced handles surrounds and defines an interior opening area.

9. The cart of claim 8, wherein the interior opening area is configured to be used for promotional space.

10. The cart of claim 1, wherein, on each lateral side of the cart, the handles and the elongate member extending between and connecting the handles define the shape of armless spectacles.

11. The cart of claim 1, further comprising an elongate member of the chassis extending linearly between and connecting the pair of handles on each lateral side of the cart.

12. The cart of claim 1, wherein the pair of handles on each lateral side of the cart are vertically located over a respective rear wheel of the cart.

13. The cart of claim 1, wherein a rear wall of the lower basket moves away so that the rear area including a rear edge of the lower basket can be used as a ledge for sitting of the toddler.

14. The cart of claim 13, wherein the rear of the upper basket is horizontally offset toward the front of the cart relative to the rear of the lower basket so as to provide clearance by which a toddler can sit up when seated on the rear edge of the lower basket.

15. A cart, comprising:
(a) a chassis;
(b) wheels attached to the chassis for rolling of the cart;
(c) an upper basket attached to the chassis and defining an upper cargo area for receiving articles for transport on the cart;
(d) a lower basket attached to the chassis and defining a lower cargo area for receiving articles for transport on the cart; and
(e) a rack located under the lower basket;
(f) wherein the chassis comprises an upper widthwise support member on which the upper basket is cantilevered over the lower basket, and a lower widthwise support member on which the lower basket is cantilevered over the rack; and
(g) wherein said upper widthwise support member is the only part of the chassis that both (i) extends the width of the cart, and (ii) is directly connected to and directly supports the upper basket in its cantilevered position over the lower basket, and said lower widthwise support member is the only part of the chassis that both (i) extends the width of the cart, and (ii) is directly connected to and directly supports the lower basket in its cantilevered position over the rack;
(g) wherein a rear area of the upper basket provides a seat for an infant; and (h) wherein a rear area of the lower basket provides a seat for a toddler.

16. A cart, comprising:
(a) a chassis;
(b) wheels attached to the chassis for rolling of the cart;
(c) an upper basket attached to the chassis and defining an upper cargo area for receiving articles for transport on the cart; and
(d) a lower basket attached to the chassis and defining a lower cargo area for receiving articles for transport on the cart;
(e) wherein a rear area of the upper basket provides a seat for an infant; and (f) wherein a lower basket provides a seat at a rear area thereof for a toddler.

17. The cart of claim 16, wherein a rear wall of the lower basket moves away so that the rear area including a rear edge of the lower basket can be used as a ledge for sitting of the toddler.

18. The cart of claim 17, wherein a rear edge of the upper basket is horizontally offset toward the front of the cart relative to the rear of the lower basket so as to provide clearance by which a toddler can sit up when seated on the ledge of the lower basket.

19. The cart of claim 16, further comprising a rack located under the lower basket, and wherein the chassis comprises an upper widthwise support member on which the upper basket is cantilevered over the lower basket, and a lower widthwise support member on which the lower basket is cantilevered over the rack.

20. The cart of claim 19, wherein said upper widthwise support member is the only part of the chassis that both (i) extends the width of the cart, and (ii) is directly connected to and directly supports the upper basket in its cantilevered position over the lower basket, and wherein said lower widthwise support member is the only part of the chassis that both (i) extends the width of the cart, and (ii) is directly connected to and directly supports the lower basket in its cantilevered position over the rack.

* * * * *